(12) United States Patent
Scheffler et al.

(10) Patent No.: US 7,240,143 B1
(45) Date of Patent: Jul. 3, 2007

(54) DATA ACCESS AND ADDRESS TRANSLATION FOR RETRIEVAL OF DATA AMONGST MULTIPLE INTERCONNECTED ACCESS NODES

(75) Inventors: Robert G. Scheffler, Windham, NH (US); Michael A. Kahn, Hudson, MA (US); Frank J. Stifter, Hampton Falls, NH (US)

(73) Assignee: Broadbus Technologies, Inc., Boxborough, MA (US)

( * ) Notice: Subject to any disclaimer, the term of this patent is extended or adjusted under 35 U.S.C. 154(b) by 500 days.

(21) Appl. No.: 10/730,748

(22) Filed: Dec. 8, 2003

Related U.S. Application Data

(60) Provisional application No. 60/476,673, filed on Jun. 6, 2003, provisional application No. 60/476,705, filed on Jun. 6, 2003.

(51) Int. Cl.
G06F 12/00 (2006.01)
(52) U.S. Cl. .................. 711/3; 711/121; 711/203
(58) Field of Classification Search ............... 711/3, 711/121, 203
See application file for complete search history.

(56) References Cited

U.S. PATENT DOCUMENTS

| | | | |
|---|---|---|---|
| 5,021,893 A | 6/1991 | Scheffler | 360/15 |
| 5,041,921 A | 8/1991 | Scheffler | 360/13 |
| 5,233,477 A | 8/1993 | Scheffler | 360/15 |
| 5,365,381 A | 11/1994 | Scheffler | 360/15 |
| 5,418,654 A | 5/1995 | Scheffler | 360/13 |
| 5,502,601 A | 3/1996 | Scheffler | 360/32 |
| 5,900,830 A | 5/1999 | Scheffler | 341/123 |
| 6,263,154 B1 | 7/2001 | Scheffler | 386/96 |
| 6,343,346 B1* | 1/2002 | Olnowich | 711/142 |
| 6,766,360 B1* | 7/2004 | Conway et al. | 709/214 |

OTHER PUBLICATIONS

NSE4256 Network Search Engine, NETLOGIC, Revision 2.0, pp. 1-44.

* cited by examiner

*Primary Examiner*—Jack A. Lane
(74) *Attorney, Agent, or Firm*—Chapin IP Law, LLC; Barry W. Chapin, Esq.

(57) ABSTRACT

A low-latency storage memory system is built from multiple memory units such as high-density random access memory. Multiple access ports provide access to memory units and send the resultant data out interface ports. The memory units communicate with the access ports through an interconnected mesh to allow any access port to access any memory unit. An address virtualization mechanism using address translators allows any access port of the memory storage system to access requested data as abstract objects without regard for the physical memory unit that the data is located in, or the absolute memory addresses within that memory unit.

63 Claims, 12 Drawing Sheets

|   | 0     | 1     | 2     | 3     | 4     | 5     | 6     | 7     |
|---|-------|-------|-------|-------|-------|-------|-------|-------|
| 0 | IC_RD | PC_RD | IC_RD | PC_WR | IC_RD | PC_RD | IC_RD | IC_WR |
| 1 | IC_RD | PC_RD | IC_RD | IC_RD | IC_RD | PC_RD | IC_RD | IC_WR |
| 2 | IC_RD | PC_RD | IC_RD | IC_RD | IC_RD | PC_RD | IC_RD | IC_WR |
| 3 | IC_RD | PC_RD | IC_RD | IC_RD | IC_RD | PC_RD | IC_RD | IC_WR |
| 4 | IC_RD | PC_RD | IC_RD | PC_WR | IC_RD | PC_RD | IC_RD | IC_WR |
| 5 | IC_RD | PC_RD | IC_RD | IC_RD | IC_RD | PC_RD | IC_RD | IC_WR |
| 6 | IC_RD | PC_RD | IC_RD | IC_RD | IC_RD | PC_RD | IC_RD | IC_WR |
| 7 | IC_RD | PC_RD | IC_RD | IC_RD | IC_RD | PC_RD | IC_RD | IC_WR |

FIG. 8

DATA ACCESS AND ADDRESS TRANSLATION FOR RETRIEVAL OF DATA AMONGST MULTIPLE INTERCONNECTED ACCESS NODES

RELATED APPLICATIONS

This application claims the benefit of U.S. Provisional Application No. 60/476,673 entitled "METHODS AND APPARATUS FOR TIME BASED MATERIAL STREAM MANIPULATION," filed on Jun. 6, 2003 and U.S. Provisional Application No. 60/476,705 entitled "METHODS AND APPARATUS FOR IMPLEMENTING A STORAGE MEMORY SYSTEM WITH MULTIPLE ACCESS PORTS AND MEMORY ADDRESS VIRTUALIZATION," also filed on Jun. 6, 2003, the entire teachings of which are incorporated herein by this reference. This application is also related to U.S. patent application Ser. No. 10/730,365 entitled "METHODS AND APPARATUS FOR PROCESSING TIME-BASED CONTENT," filed on the same date as the present application, the entire teachings of which are also incorporated herein by this reference.

FIELD OF THE INVENTION

Embodiments of the present invention include methods and apparatuses for implementing a storage memory system by connecting multiple access ports to an array of multiple large-scale memory units utilizing an interconnected mesh to allow access from any access port to any memory unit. Address translators allow address virtualization with logical addressing to be implemented within each memory unit or system-wide without regard to individual memory unit capacities.

BACKGROUND OF THE INVENTION

The recent growth in information services and data processing industries has produced a need for increased speed and capacity of storage systems that manage and store large amounts of data. Companies (and consumers in general) spend a considerable amount of money to continually upgrade their systems with faster processors, more storage, and more memory; we see evidence of it everyday in desktop computers.

The same desire to increase speed and capacity exists in both the server and storage markets as well. For storage devices, and the storage market in general, increased capacity comes in the form of higher bit densities. Increased speed comes in the form of faster hard-disk drives supporting greater and yet greater rotational speeds to reduce data access times. Notably, this increase in speed can not continue indefinitely because hard-disk drives are electromechanical devices with mechanical limitations as well as electrical limitations.

One solution for decreasing information access times is to replace hard-disk drive devices with solid-state memory devices. Solid-state devices by their very nature are more reliable because they do not wear out from friction, lack of lubrication, and other technical deficiencies that plague devices that include moving parts.

The semiconductor industry has been working hard to increase the speed of semiconductors as well as improve their density. One example of this is the semiconductor memory chip such as RAM (Random Access Memory). Today, there are several types of RAM, including Synchronous Dynamic RAM (SDRAM), Dual Data Rate Dynamic RAM (DDRDRAM), as well as yet other types of RAM devices. The storage density of these devices has historically doubled about every 18 months, with no apparent end in sight, to the point where it is now possible to store a billion bits (i.e., one gigabit) of information in a single silicon memory chip.

In addition to increased density, there have also been improvements in the speed of semiconductor devices. For example, just a couple of years ago, RAM was capable of operating at 66 MHz. Today, a standard speed of RAM devices is 200 MHz and 266 MHz.

The storage industry has experienced similar improvements in memory density. For example, capacities of hard-disk drives have doubled every 8 to 10 months. This density improvement has been driven (at least in part) by increased processor speeds, expansion of database sizes, and an ever increasing desire to instantly access data.

Expansion of storage capacity has created some new applications such as Storage Area Networks (SAN), Network Attached Storage (NAS) and streaming media applications. A SAN is similar to a Local Area Network (LAN), except that it is typically used to attach multiple servers to multiple storage devices. It may best be described as a LAN for Storage.

SANs are quite useful in applications in which multiple servers need to access the same stored data. By connecting a group of servers to a group of storage devices, the storage and data can be shared. However, when attaching multiple servers to a shared group of storage devices, performance issues may arise due to contention for a particular storage device. For instance, if more than one server tries to access the same storage device, the storage device can communicate with only one server at any instant in time, during which other servers will need to wait. Wait times are typically minimal when there are few servers trying to access a common storage device. However, as more and more servers are added to a SAN, storage contention typically becomes increasingly problematic.

To help alleviate the contention problem as well as improve scaling and redundancy, the storage industry has implemented solutions such as RAID (Redundant Array of Independent Disks), disk drives with controller caching, RAID controller caching, data striping, multiple controller interfaces, etc. However, a remaining problem is that all of these solutions are still limited by the actual transfer rate and latency of the hard-disk drive itself, which is the fundamental building block of many existing storage systems.

Disk drive transfer rates limit the amount of data that can be transferred during in a given interval of time. The disk drive transfer rate is derived from the bit density on the disk platter itself as well as the rotational speed of the disk drive. As the storage capacities increase, the transfer rates also increase.

Latency, or access delay, is a measurement of time between requesting a particular segment of data and a time when the disk drive can actually transfer the requested data. A latency metric is largely derived from the seek-time of the disk-drive, which is the time it takes to position the read/write heads to the required location on the disk. While the storage density and capacity of disk drives have been increasing dramatically, the seek-time and latency have not improved at the same pace.

SUMMARY OF THE INVENTION

Unfortunately, there are deficiencies associated with conventional techniques of managing access to data. For example, there are physical limits as to a speed at which a hard disk can rotate and a corresponding head can be positioned since it is a mechanical device. Thus, access of data from the hard disk is limited by how fast a hard disk rotates. Another deficiency of the disk drive device, even when using caching disk controllers, is that the access latency is not deterministic. That is, there is no way to predict the actual access delay for a particular request, which can vary drastically. This variation in access latency means that for real-time environments, such as streaming media, where a data block is required at a specific point in time, there is no way to predict when to read it from the storage device so that it arrives at the exact moment it is needed. Even if an array of disks were built to increase the data transfer rate, and a cache was inserted to reduce the latency, the problem associated with the non-deterministic behavior of disk drives is not solved. As network throughputs and processor speeds increase, the dependency on rotating electromechanical media (hard-disks) has emerged as a primary limiting factor. Replacing a hard-disk with a large unitary memory array as a storage device offers great performance increases. However as the size of a unitary memory array increases, so do the complexities of implementation.

It is an advancement in the art to provide an apparatus and method for servicing memory access requests from multiple sources without the ill-effects of storing data information in a single memory unit in which many users compete for access. Accordingly, one embodiment of the present invention involves distributing data in multiple memory units and utilizing a mesh to interconnect multiple memory units each of which is independently scalable in size. For example, individual memory units can be added or removed from the interconnected mesh as needed without having to shut-down the entire system or interfere with existing accesses. In addition, address translators may provide a memory addressing abstraction mechanism that allows the physical address in each memory unit to be virtualized. This allows each access port connected to the storage memory system to be abstracted away from the physical implementation-specific details of each memory unit.

Accordingly, one embodiment of the present invention includes a technique of accessing memory from multiple interconnected access nodes, at least one access node including a memory unit accessible by other interconnected access nodes. Initially, a given access node receives a memory access request from a source other than from another access node (e.g., the given access node receives a memory access request from one of its own port ineterfaces). The given access node receiving the request then determines a physical memory address associated with the memory access request to identify whether the physical memory address points (or corresponds) to a memory unit local to the given access node. If so, the given access node services the memory access request by accessing its local memory unit (e.g., electronically addressable memory) such as a memory unit at the given access node. If not, the given access node services the memory access request by accessing a memory unit located at one of the other interconnected access nodes.

Further to this embodiment and in yet other independent embodiments, the technique of determining a physical memory address may include receiving the access request at the given node and, thereafter, converting the logical address associated with the access request to a physical address. Each of multiple interconnected access nodes optionally maintains an allocation table to map logical addresses to corresponding physical addresses identifying to which of the multiple interconnected access nodes the logical address pertains. Thus, although a memory access request may not lend itself to being serviced by local memory in the given access node, the physical address alternatively identifies which of multiple other access nodes (or simply a node including a memory storage unit that does not necessarily include an access port to receive access requests) to retrieve or store the appropriate data information.

As mentioned, servicing an access request (e.g., a request to either read or write to a memory unit) may include communicating between the given access node and a memory unit at another access node over a physical point-to-point connection (e.g., a fiber cable or similar high-speed medium) supporting serial communications. Parallel data retrieved from a memory unit at a remote access node may be converted to a serial format prior to transmission over the point-to-point link.

In cases where a greater storage capacity is desired without increasing a number of port interfaces in the overall system, an access node without port interfaces to the outside world including only a memory unit and supporting circuitry can be added to the system. This type of access node (providing access to a corresponding memory unit based on requests received through the mesh) can also be referred to as a memory node, in that it does not contain any port interfaces (e.g, to the outside world). Conversely, when additional port interfaces are desired, but the system memory storage capacity is sufficient, an access node that contains only interface ports, but not a memory unit can added to the system. This flexibility of adding different types of access nodes to the system enables the storage capacity and interface port count to be separately scaled.

Multiple memory access requests received at the same access node can be scheduled to support fairness of servicing. For example, consider a situation in which the given access node receives a local memory access request (or requests) from a corresponding source coupled to the access node and, at or around the same time, the given access node also receives one or more remote memory access requests from other access nodes such as memory access requests received through a mesh interconnecting the access nodes. To ensure fairness of servicing each of the multiple requests (received both remotely and locally), the given access node schedules times for servicing the local memory access requests and remote memory access requests. The given access node therefore is not limited to servicing only locally received access requests, but instead may fairly service those requests received over the interconnected mesh from the other access nodes. Scheduling memory access requests may include interleaving memory read requests and memory write requests for servicing by based on access to a local memory unit in the given access node.

Embodiments of the invention described herein may vary depending on the application. For example, on a small scale, the mesh interconnecting the access nodes (e.g., circuit boards) may be a backplane including physical connections between the access nodes. On a medium scale, the mesh interconnecting the access nodes may be constructed utilizing fiber optic cables. On a larger scale, the mesh interconnecting the access nodes may be a network supported at least in part by the Internet or an intranet. Thus, embodiments of the invention support a wide variety of applications.

In one application, memory units associated with each of multiple interconnected access nodes store portions of a logical data stream. For example, a first portion of a logical data stream may be stored in the first access node while a second (contiguous) portion of the logical data stream may be stored in another access node. Selected portions of such a logical data stream may be retrieved from memory units of the appropriate access nodes for transmission to a user playing back the logical stream in real-time. For example, the logical data stream may be a movie being played back by the user in real-time.

Memory access requests may be periodically generated (e.g., by a port interface associated with an access node) for retrieving portions of the logical data stream. For example, in the context of a real-time data stream being streamed to a user, a source managing transmission of the logical data stream may periodically generate memory access requests for successive portions of the logical data stream for transmission to the user. There is no certainty that the given access node initially receiving the request for a portion of a particular logical data stream will be able to service the request because the requested access may pertain to memory at another access node. If a portion of the requested logical data stream is not stored in a local memory unit of the given access node, the given access node may communicate over the mesh to another access node that does store the requested portion of the logical data stream. In one embodiment, a data storage system according to the present invention comprises a local access node including: i) a node interface to support communications with multiple remote access nodes and their corresponding memory units; ii) a local memory unit to store data; iii) a port interface to receive memory access requests from a source other than the remote access nodes; and iv) a translator to process the memory access requests received through the port interface, the translator utilizing a data identifier associated with a given memory access request to determine whether to access the local memory unit or one of the multiple remote access nodes' memory units in order to service the given memory access request. As mentioned, the translator optionally converts the data identifier associated with the given memory access request via use of an allocation table mapping logical addresses associated with stored portions of a data stream to physical addresses identifying a corresponding location of the shared memory storage system in which to locate portions of the data stream.

The data identifier associated with a given memory access request includes a request for a logical data stream stored, at least in part, among multiple remote access nodes. Contents of the local memory unit and remote access nodes' memory units are maintained by both the local and remote access nodes to collectively form a shared memory storage system.

In further embodiments, an access node may further include an arbitrator (or arbiter) to arbitrate servicing of locally received memory access requests received through the port interface of the local access node and remotely received memory access requests received through the node interface from remote access nodes.

Yet another embodiment of the invention is directed towards a data storage system including i) a plurality of access nodes, each of said plurality of access nodes having an interconnect interface to support communications with the other access nodes; and ii) links interconnecting said plurality of access nodes, in which at least one of said plurality of access nodes further including a memory unit for storing data, at least one of said plurality of access nodes further including a port interface module for communications with a user, each of said plurality of access nodes further including an arbiter for arbitrating communications among the components therein. The arbiter determines which memory unit or units to access to service a memory access request from a user. Additionally, the arbiter may include an address translator for converting the data identifier and the logical address into the corresponding physical address or addresses identifying which memory unit or units to access to service the memory access request. As mentioned, in other embodiments, the translator may include an allocation table for mapping logical addresses to the corresponding physical addresses.

In yet a further embodiment, a data storage system according to the present invention includes a plurality of access nodes and links interconnecting said plurality of access nodes, an access node comprising: i) a memory unit for storing data; ii) an interconnect interface for supporting communications with the other access nodes over the links; iii) a port interface module for communications with a user; and iv) an arbiter for arbitrating communications among the memory unit, the interconnect interface and the port interface module. The arbiter may determine whether to access the local memory unit or one or more of the memory units located in the other access nodes in order to service a memory access request from a user.

In still another embodiment, a data storage system according to the invention comprises: i) a plurality of access nodes; and ii) links interconnecting said plurality of access nodes, each of said plurality of access nodes including: a) a memory means for electronically storing data; b) a first interface means for supporting communications with the other access nodes; c) a second interface means for supporting communications with a user; d) a means for arbitrating communications among the memory means, the first interface means, and the second interface means; and e) a means for determining which memory means to access to service a memory access request from the user.

In accordance with previously discussed embodiments and those in the detailed description of the invention that follows, a low-latency storage memory system may be built from an array of memory units of high-density memory. A complete storage memory system may be sufficiently large to replace the need for hard-disk drives as a storage device. Thus, one embodiment of the invention includes a memory array built from multiple memory units to allow storage capacity expansion and storage capacity reduction in each individual memory unit without requiring the entire storage memory system to be shut-down. A fully interconnected mesh allows a plurality of memory units to be accessed by a plurality of access ports. System performance may be enhanced by building the storage memory system from multiple memory units because individual memory units may be read simultaneously from different access ports. An address virtualization mechanism allows any access port to manipulate the requested data as abstract objects without regard for the physical memory unit that the data is located in, or for the absolute memory addresses or memory buffer within that memory unit. Each individual memory unit is capable of holding a plethora of objects, can have a different size and organization, and can be implemented using different generations of memory technology relative to any other memory unit in the storage memory system. Multiple access ports allow individual and random data access for many attached systems or networks.

Other embodiments of the invention include a computer system configured as a management station to perform all of the aforementioned methods via software control, or via hardware and/or software configured to perform those methods and the techniques disclosed herein. Yet other embodiments of the invention disclosed herein are software programs to perform the operations summarized above and disclosed in detail below. More particularly, a computer program product is disclosed which has a computer-readable medium including computer program logic encoded thereon to provide the methods for access nodes according to the principles of the present invention and its associated operations. The computer program logic, when executed on at least one processor within a computing system, causes the processor to perform the operations (e.g., the method embodiments above, and described in detail later) indicated herein. This arrangement of the invention is typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a computer system to cause the computer system to perform the techniques explained herein as the invention. For example, one embodiment of the present invention is directed to a computer program product that includes a computer readable medium having instructions stored thereon for managing storage of data. The instructions, when carried out by a processor of the data storage device, cause the processor to perform the steps of: i) receiving a memory access request at a given access node from a source other than from another access node; ii) determining a physical memory address associated with the memory access request; and iii) determining whether the physical memory address points to a memory unit local to the given access node and: a) if so, servicing the memory access request by accessing a memory unit local to the given access node; b) if not, servicing the memory access request by accessing a memory unit located at a node other than the given access node.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 8 is a diagram of a scheduler wheel and corresponding value entries according to an embodiment of the present invention.

DETAILED DESCRIPTION

One aspect of the present invention is to provide a mass data storage system supporting a very fast transfer rate, extremely low latency access to random data, and deterministic access behavior. Such a system is useful in a variety of applications, e.g., general computing environments, but is particularly useful for highly utilized database tables, large file sizes, highly utilized file servers, and high-density streaming applications.

For example, one approach would be to vastly increase the size of the memory in a conventional computer system. The problem with that solution is that existing processors are limited to the size of the address bus, and as such, can not address the vast amount of memory in a timely manner. Another potential drawback to just adding memory to the processor is memory fragmentation. Memory fragmentation occurs as objects of one size are deleted from memory and replaced with objects of a different size. The processor spends much of its time deciding where pieces of data are stored where in physical memory. A memory management unit can be added to a processor to allow the virtualization of address spaces, but this solution is largely dependant on software for control. Solving the problem in this way does not help when the memory space is shared by multiple processors potentially with different operating systems.

An embodiment of the inventive storage memory system does away with disk drives in favor of solid-state memory (of sufficient size). The solid-state memory units of the storage system are divided into memory units, enabling flexibility (scalability) in organizing each individual memory unit. This allows the storage memory system to be expanded at any time even though such a system may include different sized (solid state) memory devices and architectures in each separate memory unit. The memory units are interconnected via a mesh such that that if a particular memory unit does not include the requested data, the data is otherwise retrieved over the mesh from memory units in other access nodes. The memory units are interconnected to I/O (Input/Output) interfaces, or access ports, utilizing an interconnected mesh which allows each access port access to any of the memory units. In one application, a virtual addressing mechanism is implemented to allow the access ports to access data stored in the memory units. Related data may be stored as abstract objects without regard for the physical memory unit the data is located in, or the absolute memory addresses within that memory unit.

Although the techniques described herein can be used in storage applications, and particularly to multiple storage devices interconnected via a fabric (or mesh), the techniques are also well-suited for other applications that support management (including access and streaming) of large volumes of data.

Figure 1:
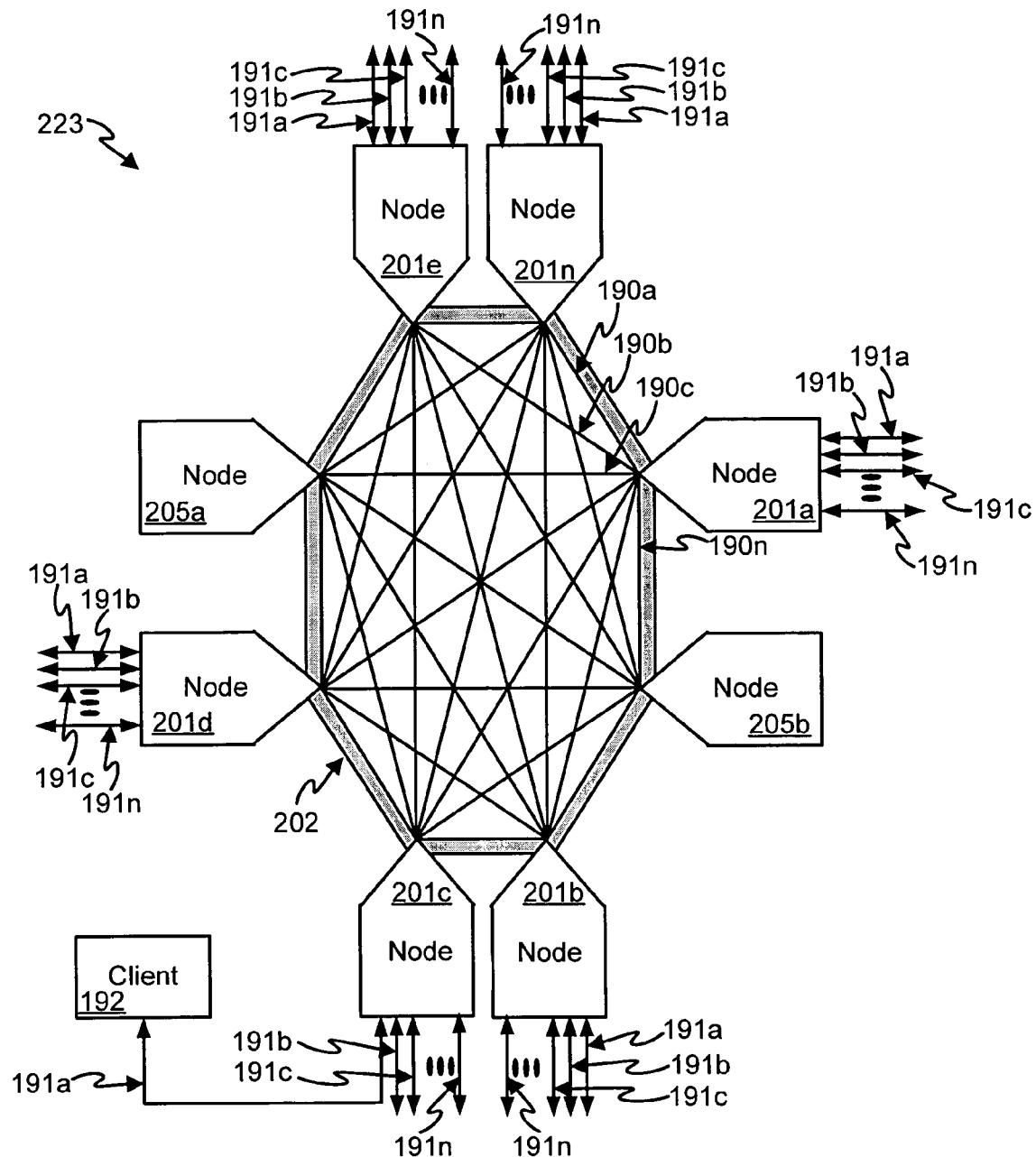
FIG. 1 is a block diagram of a storage system including multiple nodes according to an embodiment of the present invention.

FIG. 1 is a block diagram of a memory storage system 223 according to an embodiment of the invention. As shown, system 223 includes multiple access nodes 201a, 201b, . . . , 201n, memory nodes 205a, 205b, multiple interconnect busses 190a, 190b, 190c, . . . , 190n, and interface ports 191a, 191b, 191c, . . . , 191n. In general, system 223 is scalable to include any number of access nodes 201 and memory nodes 205, each of which connects to the other access nodes and memory nodes via interconnect busses 190.

As a group, interconnect busses 190 form an interconnected mesh 202 or fabric generally providing each access node 201 or memory node 205 a communication path to other access nodes 201 and memory nodes. Multiple simultaneous communication paths thus can be established between the individual nodes 201 and 205. Typically, interconnect busses 190 include communication media such as fiber optic cable(s), twisted pairs of wire, or printed circuit boards at the physical layer of mesh 202.

When an interface port 191 receives an access request (from a requesting source such as client 192) to read or write data, the corresponding access node 201 receiving the request determines whether the requested data resides in its memory unit 101 or in a remote access node 201 or memory node 205 in manner similar to that previously discussed. If the data resides in the local node's 201 (e.g., memory unit 101 in FIG. 2), then the request is serviced directly without requiring any communication over an interconnect bus 190. However, if the requested data resides in another access node 201 or memory node 205, the local access node 201 determines at which remote node 201 (or 205) the data resides and sets up a connection through the interconnected mesh 202 using an appropriate interconnect bus 190 (e.g., portion of mesh 202). A specific interconnect bus 190 that will be used to access a memory unit of another node 201 (or 205) depends on which node includes the requested data.

Every node in system 223 does not necessarily have to include interface ports 191. In fact it may be useful that some nodes are available for storage without any interface ports. For example, nodes 205 are shown without any interface ports 191, but are used instead as storage only nodes. Conversely, an access node 201 containing interface ports without a local memory unit, according to one embodiment, allows ports to be added without expanding the storage capacity of the memory storage system 223. The flexibility of storage memory system 223 allows the storage capacity and the interface port count to be independently scalable based on the application. An installed operating system 223 can have more nodes (both access nodes 201 and memory nodes 205) added whenever the storage or interface port requirements of the application change.

Each interconnect bus 190 can be implemented with any number of technologies depending on the final application of the system 223. If a distributed system of rack-mount boxes (including multiple nodes 201) is desired, copper or fiber optic cables can be used as interconnect bus 190 to support communications amongst nodes 201. If a single chassis with multiple cards or blades is preferable, then the interconnected mesh 202 can be implemented on a backplane of a printed circuit board. Any other suitable medium can be used to support communication among nodes 201.

Building storage memory system 223 to include multiple nodes 201 and utilizing the interconnected mesh 202 to support communications enables increased storage capacity and memory access to the other nodes. Performance is increased because each access node 201 has access to the other nodes 201 (and 205) through the interconnected mesh 202, which means that a single piece of data in an access node 201 (or 205) can be read by multiple other nodes. This provides a great deal of flexibility because any interface port 191 on any access node 201 can access the memory unit 101 within any other access node 201 or memory node 205.

The storage memory system 223 is particularly useful for applications where any number of clients 192 request access to a shared number of logical data streams. Multiple clients can communicate over interface ports 191 and have unrestricted access to any data stream or file contained in the memory units of any node 201 (and memory nodes 205) in the system 223. As an example, when streaming video or audio, there are typically many more clients than there is content to choose from. When this happens, there will be many different clients viewing or listening to a shared piece of content, usually starting at different times. Each of the clients will have started viewing at a different time, so all the playback data streams will be skewed in real-time relative to each other. Since each interface port has access through the interconnected mesh to any of the memory units contained in any node, the inventive memory storage system enables unlimited content sharing. The flexibility of adding interface ports 191 as more clients are added, and adding more nodes as storage capacity is needed, enables the storage memory system to scale its throughput and capacity completely independently.

Figure 2:
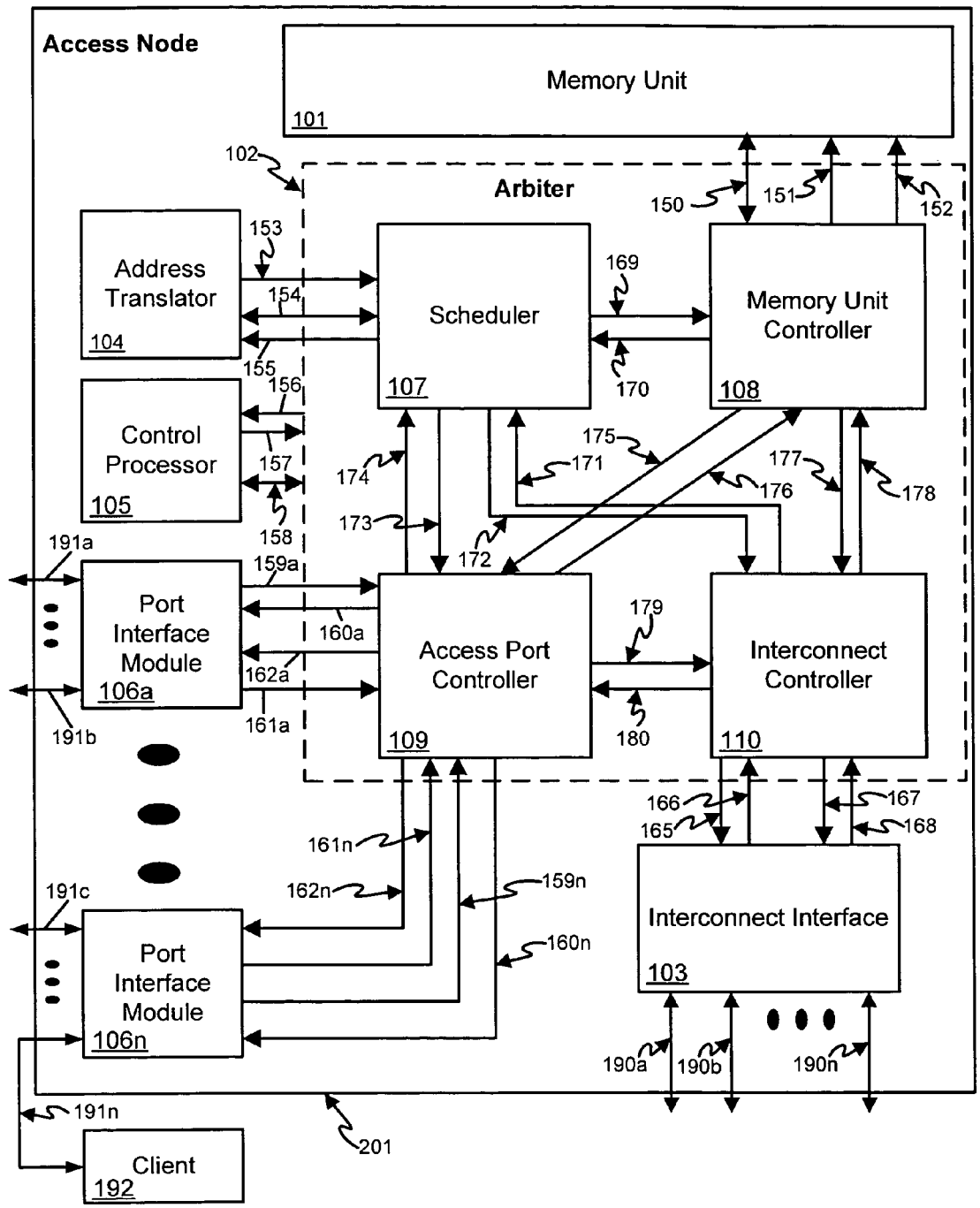
FIG. 2 is a block diagram of a node for processing requests and accessing memory according to an embodiment of the present invention.

FIG. 2 is a block diagram of an access node 201 in accordance with one embodiment of the present invention. As shown, access node 201 includes memory unit 101, address translator 104, control processor 105, port interface modules 106a, . . . , 106n, interconnect interface 103, and arbiter 102. Arbiter 102 itself includes scheduler 107, memory unit controller 108, access port controller 109, and interconnect controller 110. There are several operating modes for the storage memory node 201 depicted in FIG. 2, which can be described as follows.

In general, configuration and operational modes of the arbiter 102 are controlled by control processor 105 (running its own operating system) utilizing data bus 158, address and control bus 157, and control bus 156. Use of these signals facilitates control processor 105 access to the individual configuration and control registers contained in each element within the arbiter 102. Following initialization, the arbiter 102 is ready for operation.

In one embodiment, there are three general paths defined in arbiter 102. For example, there is a path between port interface module 106 and memory unit 101. There also is a path between interconnect interface 103 and memory unit 101. Additionally, there is a path between port interface module 106 and interconnect interface 103. Each of these paths can operate in either direction depending on whether an access involves a read or write operation.

When client 192 requires a file, corresponding to a stored logical data stream, a piece of content, or any other data, the request for service arrives (such as at port interface module 106) through one of multiple interfaces 191.

For example, port interface module 106 may send read or write commands over request line 161 and data bus 159 to the access port controller 109. The access port controller 109 then asserts a request to scheduler 107 over request line 174, which includes the DataID (data identifier) and logical address for the data (i.e., the identifier of a particular string, segment or object of data) to be accessed.

When the scheduler 107 is ready to service this request, it translates the DataID and the logical address of the request into a physical address utilizing address translator 104. Specifically, the scheduler 107 sends a command to address translator 104 over command bus 155. Address translator generates a response to the access request over response bus 153. In one embodiment, the scheduler 107 can also directly read/write address translation values from/to the address translator 104 using bus 154.

Once scheduler 107 is ready for servicing the access request, it grants control to the access port controller 109 via an acknowledgment signal over bus 173. Scheduler 107 forwards the physical address (previously received from address translator 104) to the memory unit controller 108 over bus 169, to the interconnect controller 110 over bus 172, or to the access port controller 109 over bus 173, depending on the type of access requested. The access port controller 109 then enables a suitable port interface module 106 for access using an acknowledge line 162.

If the access request includes a request to write inbound data from, e.g., client 192, the data arrives through the interface 191. Port interface module 106 accepts the data, then sends the data through the corresponding bus 159 to access port controller 109, which then forwards the data to memory unit controller 108 via bus 176 (for local access node 201 writes) or interconnect controller 110 via bus 179 (remote access node 201 or memory node 205 writes) depending on the physical address (associated with the request) that was translated via address translator 104.

If the physical address translated in address translator 104 indicates a local memory unit 101 access, then the memory unit controller 108 sends the physical address over address bus 151, suitable control lines 152, and data bus 150 to the local memory unit 101 to write the data. On the other hand, if the physical address translated in address translator 104 indicates a remote memory unit access (such as from another access node 201 or memory node 205), then the interconnect controller 110 sends the physical address over bus 167 and corresponding request over bus 165 to the interconnect interface 103. The interconnect interface 103 then uses the physical address to determine the remote node to which the data will be written (based on the physical address), and which interconnect bus 190 shall be utilized to reach the appropriate remote node. A write command is then sent by interconnect interface 103, over the appropriate interconnect bus 190 to the remote node, and is then followed by the write data.

When the client 192 generates a read request, the command arrives over interface 191 at the port interface module 106. Next, the port interface module 106 requests a read (in response to receiving a read access request over a corresponding interface 191) from access port controller 109, the scheduler 107 translates the logical address using address translator 104. In turn, the scheduler 107 sends the retrieved physical address from address translator 104 to the memory unit controller 108 (via bus 169) or the interconnect controller 110 (via bus 172), depending on the physical address returned from address translator 104.

If the physical address returned from address translator 104 indicates a local memory unit 101 access, then the memory unit controller 108 sends a physical address over address bus 151 and control lines 152. After a suitable access delay time, memory unit 101 returns the read data to memory unit controller 108 over bus 150, and releases its scheduled time slot (e.g., an interval of time in which scheduler 107 allocates for the memory read) over control bus 170 to scheduler 107. The memory unit controller 108 then returns the retrieved data over bus 175 to access port controller 109. In turn, access port controller 109 forwards the retrieved data to the appropriate port interface module 106 (originally making the request) over bus 160.

If the physical address translated in (or returned by) address translator 104 indicates a remote memory unit read access, scheduler 107 sends the physical address to interconnect controller as previously mentioned. Interconnect controller 110 in turn sends the physical address over bus 167 and request over bus 165 to the interconnect interface 103. The interconnect interface 103 uses the physical address to determine the remote node required, and thus which interconnect bus 190a, 190b, ..., 190n (190), should be utilized to reach the remote node.

A read command including the physical address, is then sent by interconnect interface 103 over the appropriate interconnect bus 190 to the remote node. The remote node then responds with the requested read data over the appropriate interconnect bus 190 to the interconnect interface 103. The interconnect interface 103 returns the data over bus 168 to interconnect controller 110, and then over bus 180 to the access port controller 109, which in turn sends the data over the appropriate bus 160 to its associated port interface module 106, and finally to client 192 (or requesting source) using interface 191. In this way, if requested data is not stored locally, the request is forwarded to a remote node (e.g., memory node 205 or access node 201) for retrieval of the data.

Access to the local memory unit 101 in any node can also originate from a remote node over an interconnect bus 190. In this instance, a request arrives through the interconnect interface 103. The interconnect interface 103 then requests service from the interconnect controller 110 over request line 166. Interconnect controller 110 requests service using line 171 to the scheduler 107. When scheduler 107 has an appropriate time slot available for servicing the access request, it grants access to the interconnect controller 110 using line 172. If a logical to physical address translation is required, the scheduler 107 uses address translator 104 to perform the translation similar to the technique as previously discussed, and sends the physical address to the memory unit controller 108 over bus 169.

If the remote access request is a write request, interconnect controller 110 then uses bus 178 to send the write data to memory unit controller 108, which in turn sends a physical address over address bus 151, suitable control lines 152, and data over bus 150 to the memory unit 101. If the remote access is a read, interconnect controller 110 sends the read request to scheduler 107 over line 171 along with the address. If a logical to physical address translation is required, the scheduler 107 uses address translator 104 to perform the translation similar to the technique as previously discussed, and sends the physical address to the memory unit controller 108 over bus 169. Memory unit controller 108 then sends a physical address over address bus 151, and appropriate control lines 152. After an access delay time, memory unit 101 returns the read data to memory unit controller 108 over bus 150, and releases its scheduled time slot over control bus 170 to scheduler 107. The data read is then sent from memory unit controller 108, over bus 177, to the interconnect controller 110, then over bus 167 to the interconnect interface 103, and finally to the remote access node over the appropriate interconnect bus 190.

Since requests can originate from the local node, or from a remote node, there is no particular relationship between the number of port interfaces 191 and the number or size of the memory units 101. This aspect of the invention according to one embodiment enables functionality in a node that doesn't contain any port interfaces (e.g., node 205), which is useful to expand the storage capacity by adding memory unit 101 without requiring the addition of port interfaces 191. Similarly, a node without memory unit 101 can be added in order to increase the number of port interfaces 191. If a particular node does not contain any port interfaces 191, then the access port controller 109 can be eliminated from that node's arbiter 102. Likewise, if a particular node does not contain a memory unit 101, then the memory unit controller 108 can be eliminated from that node's arbiter 102.

Arbiter 102 includes scheduler 107 that continuously looks for service requests generated by the memory unit controller 108, access port controller 109 and interconnect controller 110. As discussed, when a scheduled request requires address translation, the scheduler 107 sends a command over bus 155 to address translator 104. The address translator 104 then responds over bus 153 with a translated physical address back to scheduler 107. The scheduler 107 uses this translated (or returned) physical address for the pending access. The scheduler 107 uses a programmable table such as a wheel to schedule the read and write accesses from each section of the arbiter 102. This will be discussed in more detail later in the specification in connection with FIG. 7.

It should be noted that one embodiment of the present invention is directed to a computer program product on a computer readable medium having instructions stored thereon for managing storage of data consistent with techniques described herein. All or a portion of functions supported by access node 201 may be supported by a processor device (e.g., a central, processing unit, micro-controller, etc.) executing instructions stored on a computer readable medium. The instructions, when carried out by a processor of access node 201, cause the processor to perform the steps of first receiving a memory access request at a given access node from a source other than from another access node. The processor then determines a physical memory address associated with the memory access request. If the physical memory address points (or corresponds) to an address associated with the memory unit local to the given access node, the access node services the access request by accessing a memory unit local to the given access node. Alternatively, if the physical memory address points (or corresponds) to an address associated with a memory unit of a remote access node, the access node forwards the access request message to an appropriate remote access node through mesh 202 for servicing.

Figure 3:
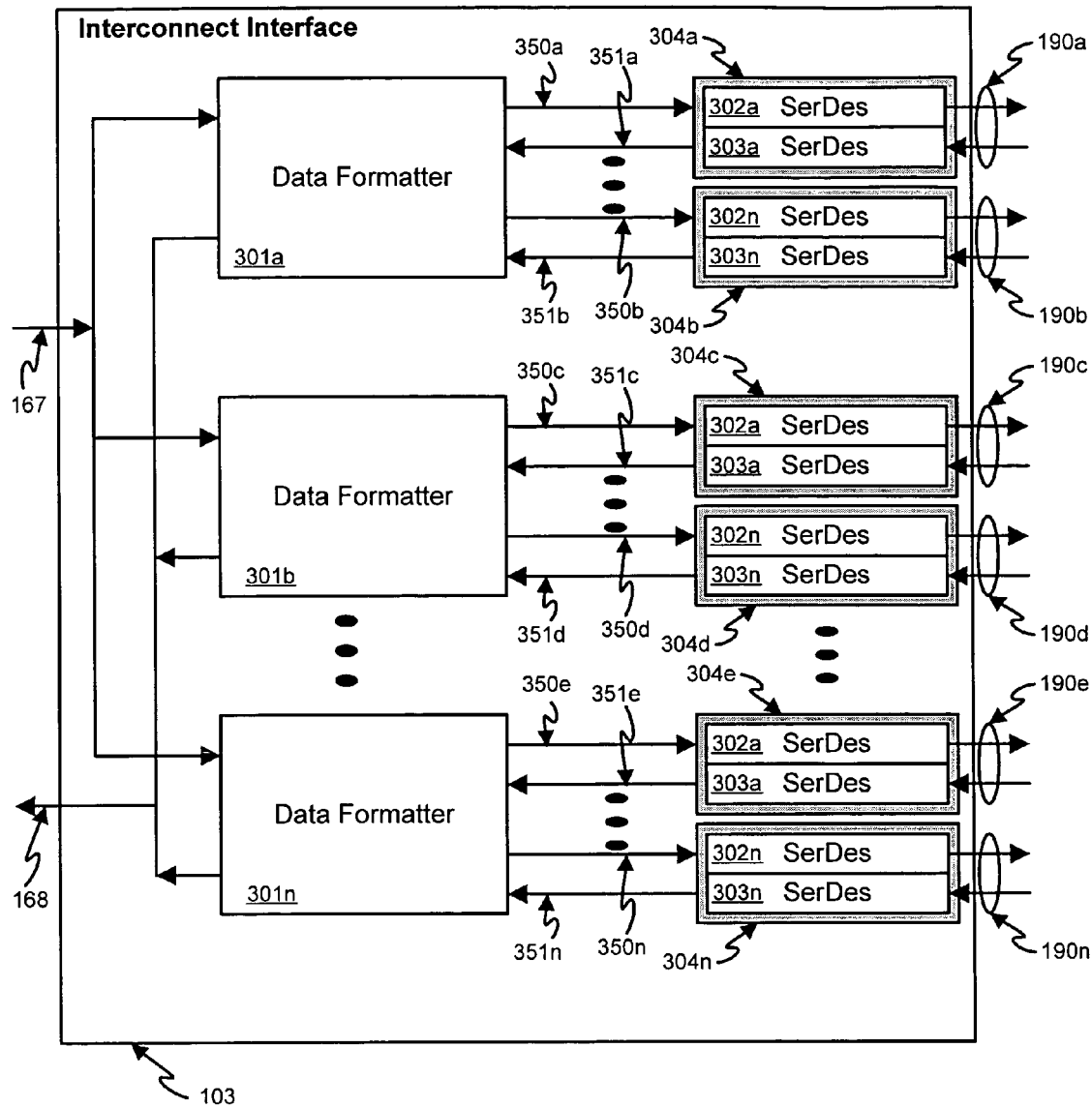
FIG. 3 is a detailed block diagram of an interconnect interface according to an embodiment of the present invention.

FIG. 3 is a block diagram of an interconnect interface 103 associated with nodes 201 or 205 according to one embodiment of the invention. As shown, interconnect interface 103 includes one or more data formatters 301a, 301b, ..., 301n, and corresponding one or more Serialization/Deserialization (SerDes) transceivers 304a, 304b, ..., 304n.

In general, the SerDes transceivers 304 convert data from a parallel data format into a serial data format and vice versa. A serial data format is desirable for transmission of data on interconnect bus 190 because the conductor count or circuit board trace count can be reduced while maintaining a higher data throughput rate. Additionally, clocking and synchronization information can be embedded into the serial data stream which allows a corresponding receiver (such as a Ser/Des receiver 303) to lock onto the corresponding transmitter (Ser/Des transmitter 302) more easily without requiring a shared clock.

More specifically, each individual SerDes transceiver 304 comprises a SerDes transmitter 302a, ..., 302n and a SerDes receiver 303a, ..., 303n. Ser/Des transmitter 302 converts parallel data from data formatter 301 into serial data that is transmitted out on interconnect bus 190. In a reverse direction, Ser/Des receiver 303 converts serial data received from interconnect bus 190 into parallel data that is forwarded to data formatter 301. Each of the SerDes transmitters 302 and receivers 303 are connected to individual interconnect busses 190a, 190b, ..., 190n, and corresponding transmit bus 350a, 350b, ..., 350n, and receive bus 351a, 351b, ..., 351n. Each of the individual interconnect busses 190 include connections for both transmit and receive directions.

Each SerDes transmitter 302 receives data over bus 350 from a data formatter 301, converts it into serial data, and serially transmits the data over a corresponding interconnect bus 190. Conversely, the SerDes 303 receives serial data over interconnect bus 190, extracts and decodes the data from the serial data stream, and forwards it through a respective receive bus 351. For increased bandwidth on the interconnect busses 190, multiple SerDes transmitters 302 and SerDes receivers 303 can be implemented in a single transceiver 304.

Data formatters 301 convert as well as control the data flowing from the arbiter 102 into the SerDes transceiver 304, and from the SerDes transceiver 304 back to the arbiter 102. Specifically, data arrives from the arbiter 102 over bus 167 and is presented to the data formatter 301 where it is buffered. Once a suitable quantity of data has been buffered, the appropriate read or write command along with the buffered data is sent over bus 350 to SerDes transmitter 302, and subsequently sent out over interconnect bus 190.

When a SerDes receiver 303 has received valid data or commands, it is forwarded over bus 351 to the data formatter 301 where it is buffered. Once data formatter 301 has received a command or suitable quantity of data, it is sent over bus 168 to the arbiter 102. Each of the data formatters 301 can interface to multiple SerDes transceivers 304 depending on how many interconnects the storage memory system requires and the capability of the data formatter 301. There can also be multiple data formatters 301 to implement a suitable number of interconnect busses 190 into the interconnected mesh 202.

Each block of data sent over interconnect 190 is preceded by a suitable memory unit read, port interface read, memory unit read response, port interface read response, memory unit write, memory unit write response, or other commands as needed. These commands instruct the access node 201 or memory node 205 on the receiving end of the interconnect what to do with the associated data. The commands are also used to signal responses to commands. Additional commands other than those can be implemented as needed or desired.

Figure 4:
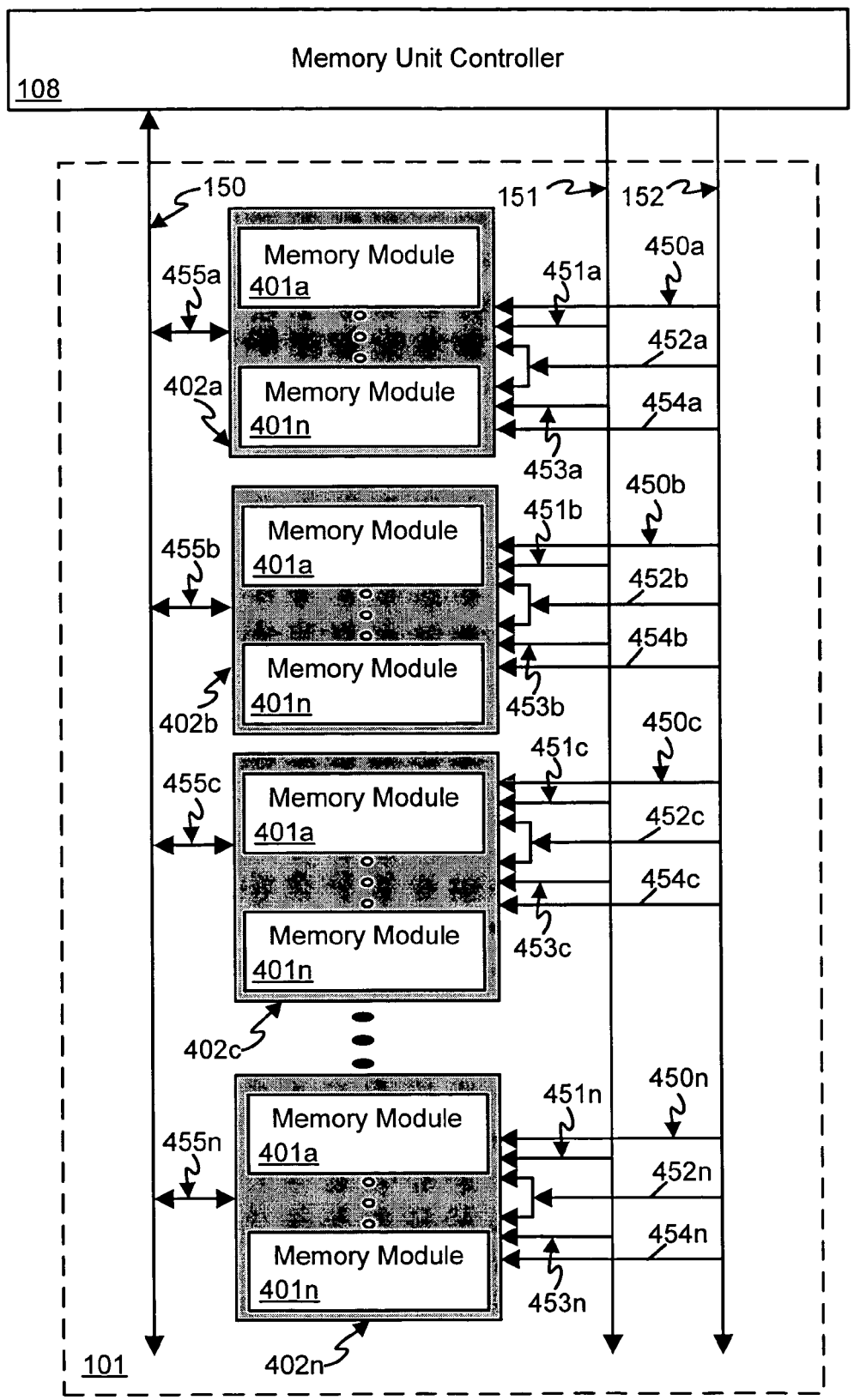
FIG. 4 is a detailed block diagram of a memory unit according to an embodiment of the present invention.

FIG. 4 is a block diagram of memory unit 101 according to an embodiment of the invention. As shown, memory unit 101 includes one or more memory banks 402a, 402b, ..., 402n. Each memory bank 402 itself comprises one or multiple memory modules 401a, ..., 401n (401) depending on the size of the data bus 150.

Since each memory bank 402 does not connect directly to a processor, there is no inherent limitation to the width of data bus 150, such as 32, 64 or 128 bits. A use of wider data buses 150, such as 256, 512, 1024 bits or greater, increase the throughput of the memory bank 402 connected to the memory unit controller 108. Any suitable bus width associated with memory module 401, memory bank 402, and data bus 150 can be used, however, there is a relationship between them. For example, if data bus supports a width of 1024 bits and each memory module 401 is 64 bits wide, then each memory bank 402 would contain 16 memory modules 401.

Multiple memory banks 402 can be implemented to increase the storage capacity of the memory unit 101. Each of the memory banks 402 connects to the data bus 150 via a corresponding data bus 455a, 455b, ..., 455n.

In general, each of the memory banks 402 receives address information from address bus 151 over address lines 451*a*, 451*b*, 451*c*, . . . , 451*n* and address lines 453*a*, 453*b*, . . . , 453*n*. Control information from control bus 152 is sent to memory banks 402 over corresponding control lines 450*a*, 450*b*, 450*c*, . . . , 450*n*, memory bank select lines 452*a*, 452*b*, . . . , 452*n*, and control lines 454*a*, 454*b*, . . . , 454*n*.

When the memory unit controller 108 needs to access the memory unit 101, suitable control signals are sent over control bus 152 and subsequently over control lines 450, or control lines 454. These control signals depend on the specific memory technology utilized in the memory module 401, but include signals such as clock enable signals, bank select signals, row address strobes, column address strobes, and read/write enables, etc.

In addition to the above-mentioned signals, a memory bank enable signal, such as a chip select signal, is also sent over control bus 152 and subsequently over memory bank select line 452, depending on which memory bank within the memory unit 101 will be accessed. Memory unit controller 108 sends memory address information over address bus 151, which is subsequently sent over address lines 451 and 453 to a corresponding memory bank 402 and memory module 401. The exact format of the address information is dependent on the specific memory technology utilized in the memory module 401, but would typically include row address and column address information.

If the control signals arriving at the memory bank 402 indicate a read operation, then the appropriate data is read from a memory module 401, sent out over data bus 455 on to data bus 150, to memory unit controller 108. If the control signals arriving at the memory bank 402 indicates a write operation, then the appropriate data is sent out from memory unit controller 108, onto data bus 150 and data bus 455, and is subsequently written to the appropriate memory module 401 (e.g., including RAM based memory devices such as SRAM, DRAM, FRAM, etc.

Figure 5:
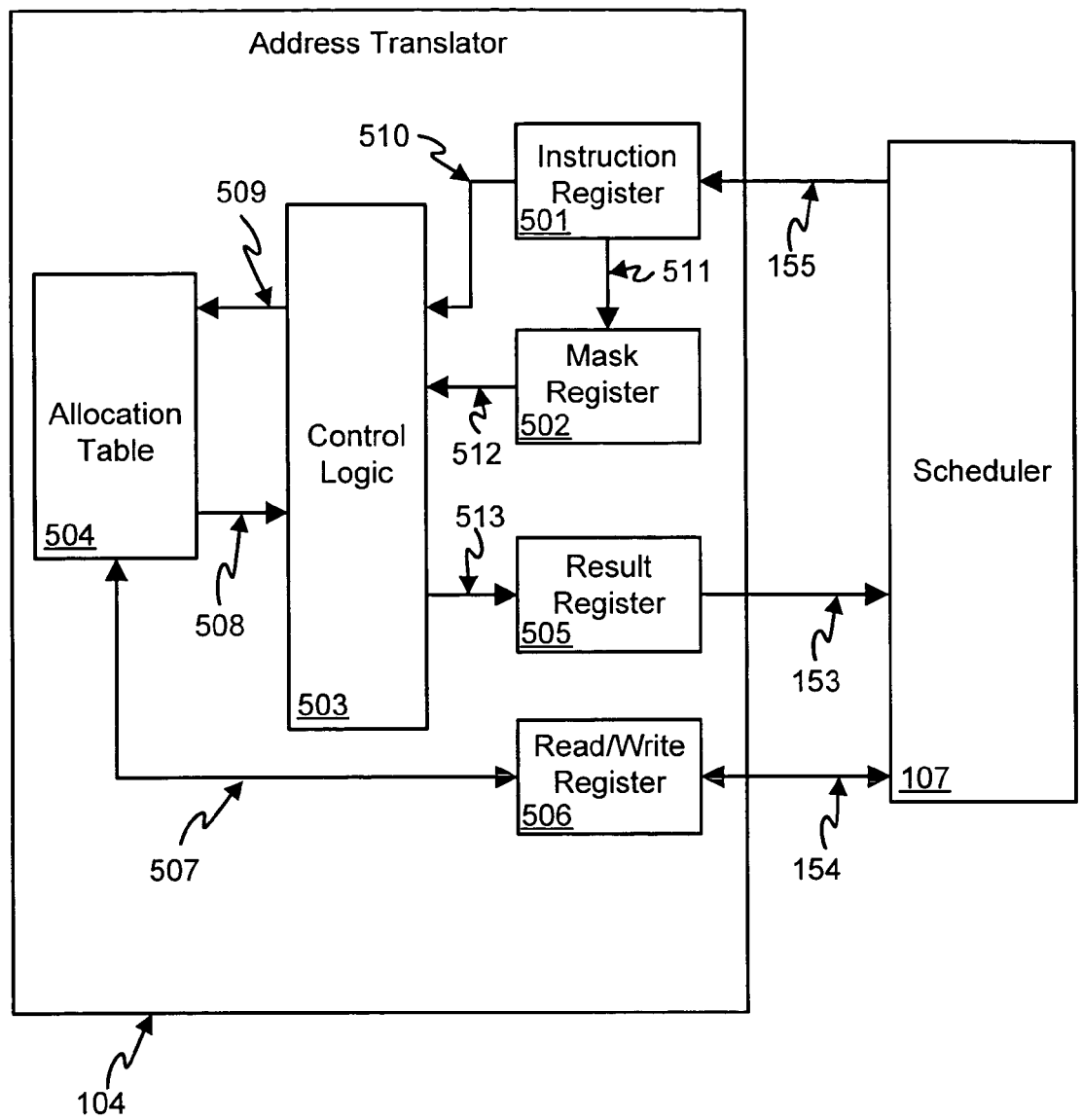
FIG. 5 is a detailed block diagram of an address translator according to an embodiment of the present invention.

FIG. 5 is a block diagram of an address translator 104 associated with a access node 201 or memory node 205 according to an embodiment of the present invention. As shown, address translator 104 includes allocation table 504, control logic 503, instruction register 501, mask register 502, result register 505, and read/write register 506.

Address translator 104 can be implemented utilizing a commercially available Content Addressable Memory (CAM), which are sometimes referred to as Network Search Engines (NSE). One basic function of the address translator 104 is to support a searchable and modifiable lookup table. For example, each memory unit 101 is divided into memory banks 402; each memory bank 402 is then further divided into multiple memory modules 401 (buffers). Each memory buffer represents an allocatable piece of memory, allocatable page of memory, or allocatable cluster of memory. The absolute size of each memory buffer depends on the application and the type of data to be stored in the memory unit 101.

Each of these memory modules 401 (buffers) has an associated entry in the allocation table 504 within the address translator 104. The association of allocation table 504 entries to the memory buffers contained in memory unit 101 allows each memory buffer to be allocated and freed based on the entries in the allocation table 504. The physical address of the memory buffer can be determined by the location within the allocated table 504, and the data stored inside, the allocation table 504.

The address translator 104 enables the virtualization of physical addresses in the hardware by allowing the scheduler 107 to store a DataID (data identifier) in the allocation table 504 at the location that corresponds to the physical address of the memory buffer. Once the scheduler 107 has stored a DataID in the allocation table 504, the scheduler can determine the physical address of the memory buffer simply by searching for the DataID in the allocation table. The address offset within the allocation table is then used to calculate the physical memory buffer location. Specifically, when a new memory buffer is (added to the system) and requires writing, the scheduler 107 forwards a suitable set mask register command to find an unallocated memory buffer over instruction bus 155 to instruction register 501 inside the address translator 104. The instruction register 501 moves the mask value to mask register 502 over bus 511 to search for an unallocated (or unused) memory buffer. A search is started by sending the search instruction and mask value to the control logic 503 over bus 510 and bus 512. The control logic 503 performs a search in the allocation table 504 using suitable bus 509 and bus 508.

Once a match is found, the control logic 503 returns the result over bus 513 to the result register 505 and subsequently over bus 153 to the scheduler 107. The result informs scheduler 107 of an available memory buffer within the memory unit 101. Scheduler 107 uses the address of the available allocation table entry and translates it into the physical address of the unallocated memory buffer. The scheduler 107 writes the DataID to the available location in the allocation table 504 over bus 155, instruction register 501, which in turn drives control logic 503 indicating that the physical memory buffer is now allocated.

After a memory buffer (or memory module 401) has been allocated (for use) in the allocation table 504, subsequent read and writes to that specific memory buffer can be performed directly until the memory buffer has been filled. Each time additional data is written to the memory buffer, the appropriate allocation table entry is updated with the current memory buffer offsets and suitable status flags using the data bus 154, read/write register 506, and bus 507.

Scheduler 107 can also utilize address translator 104 to search for an existing memory buffer to enable read functions. In this case, the scheduler 107 sends an appropriate search instruction including the DataID and the logical address for the data requested. The control logic 503 then searches the allocation table 504 to find a match for the requested DataID and logical address. Once a match is found, the control logic 503 returns the result through result register 505 to the scheduler 107 over bus 153. The scheduler 107 then uses the result from the address translator 104 to calculate the physical address of the memory buffer that contains the data requested.

Using a searchable allocation table 504 within the address translator 104 as described herein enables the scheduler 107 to allocate and deallocate memory buffers by simply setting the appropriate status flags in the allocation table 504. Based on this technique, a file or piece of content stored under a single DataID can span over multiple memory buffers without requiring the memory buffers to be in consecutive physical locations.

During operation of storage system 223 over time, the continuous allocation and de-allocation of memory buffers may cause the fragmentation of memory. This can be thought of as left over unused 'holes' in the memory system, which can be scattered all over the memory units. By utilizing the address translator 104, the occurrence of memory fragmentation will have no impact on the performance or usability of the storage memory system since the physical addresses have been abstracted away from the DataID, logical address, and memory buffer offset. The address translator 104 allows the size of each memory unit to be different. Memory units can also be removed or added without disrupting the operation of other memory units in the system.

Figure 6:
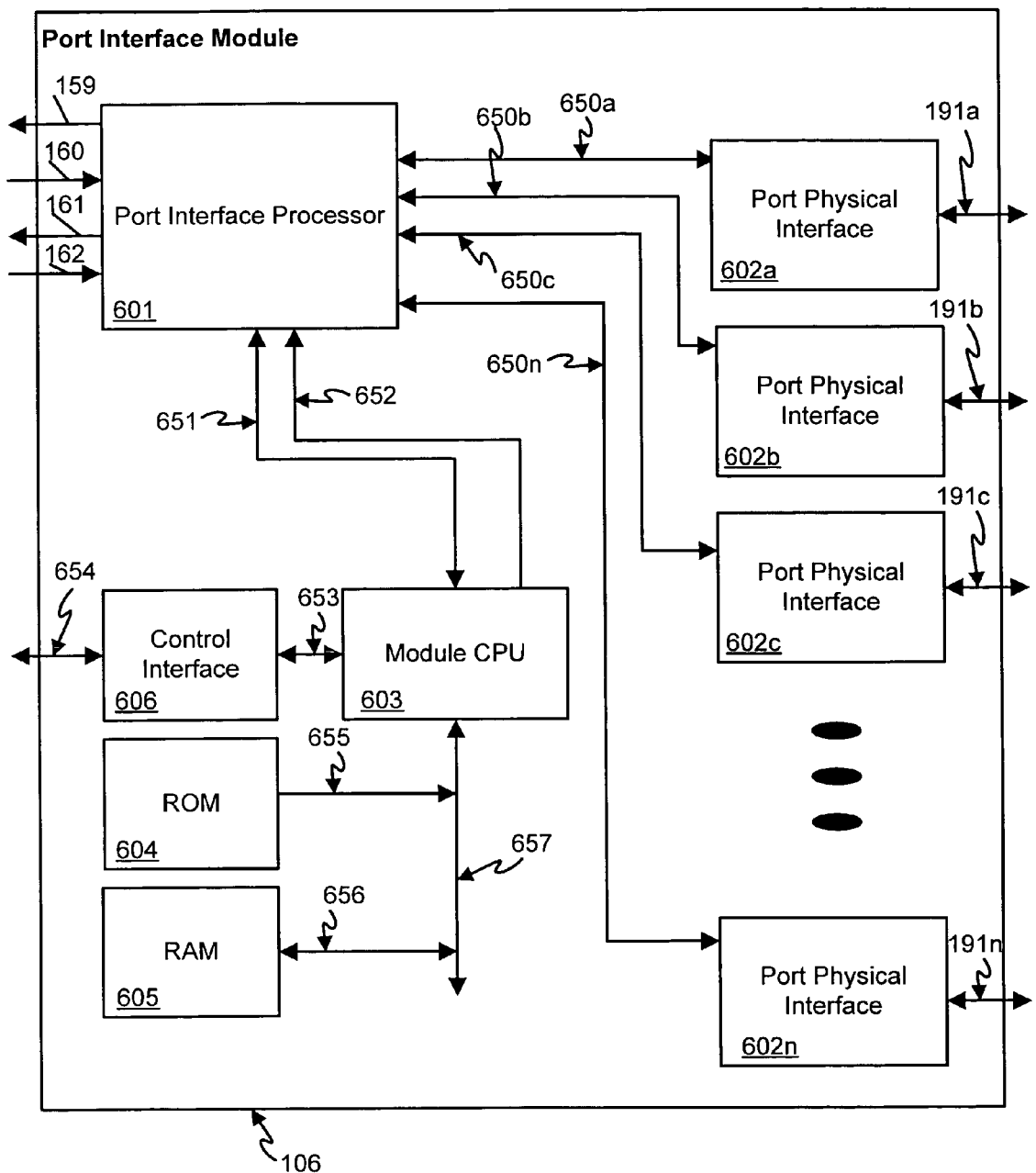
FIG. 6 is a detailed block diagram of a port interface module according to an embodiment of the present invention.

FIG. 6 is a block diagram of a port interface module 106 associated with access node 201 according to an embodiment of the invention. As shown, port interface module 106 includes port interface processor 601, control interface 606, Read Only Memory (ROM) 604, Random Access Memory (RAM) 605, module CPU (Central Processing Unit) 603, port physical interfaces 602*a*, 602*b*, . . . , 602*n*. The port interface module 106 is primarily used as an interface to the input/output ports associated with nodes 201 of the storage memory system 223.

The port interface module 106 includes a port interface processor 601, which is responsible for reading and writing to the arbiter 102, and multiple port physical interfaces 602*a*, 602*b*, . . . , 602*n* (602). The CPU 603 controls the port interface processor 601 in addition to supporting components such as control interface 606. CPU 603 couples to control interface 606 over bus 653, ROM 604 via busses 657 and 655, and RAM 605 via busses 657, 656.

The control interface 606 supports a local control connection 654 such as a communication link based on Ethernet or other serial protocol. If required, the module CPU 603 is able to configure and control the port interface processor 601 via data bus 651 and control bus 652. The software inside the module CPU 603 provides the port interface module 106 and its specific personality. Some useful variations might include a streaming video output module, an interface module that makes the port behave like a storage device, a loading interface module for loading data into the memory units, or an external storage interface module that allows the access port to interface to external hard-drives, tape drives etc.

The port physical interfaces 602*a*, 602*b*, . . . , 602*n* are used to implement the external physical port such as Ethernet, fiber channel, or similar physical interface. Each port physical interface 602 has an external connection 191*a*, 191*b*, 191*c*, . . . , 191*n* (191), as well as an internal interface 650*a*, 650*b*, 650*c*, . . . , 650*n* (650) which connects to the port interface processor 601.

When a request for data arrives over a port 191, the port physical interface 602 decodes the request and forwards it over bus 650 to the port interface processor 601. If the request is a write command, the port interface processor 601 sends the request over bus 161 and the data over bus 159 to access port controller 109 of arbiter 102. If the request is a read command, the port interface processor 601 sends the read request over bus 161 and waits for the response over bus 162 and the resulting data over bus 160 as previously discussed. After the read data is received at port interface processor 601, it is then forwarded from port interface processor 601 to the appropriate port physical interface 602, which then transmits the data over the appropriate port 191 to the requesting party. In a streaming media application, the port interface processor 601, or the module CPU 603 can automatically (and periodically) request data to be transmitted out through bus 160. This allows the output data to be transmitted piece-by-piece without requiring a request from an external client 192 for each piece of data. For example, a source requesting retrieval of data may be a process running on an access node 201 itself. Once the client requested the initial streaming data, the data would be continuously sent (potentially in real-time) without further requests necessary from the client 192.

One example further illustrating functionality of port interface module 106 can be found in U.S. patent application Ser. No. 10/730,365 entitled "METHODS AND APPARATUS FOR PROCESSING TIME-BASED CONTENT," filed on an even date herewith along with the present application, the entire teachings of which are incorporated herein by this reference. For example, port interface processor 601 optionally supports transmission of streaming data similar to stream processor 103 (in the referenced application) and module CPU 603 optionally produces the enhanced data stream including PTP information similar to analyzer 101 (in the referenced application).

Figure 7:
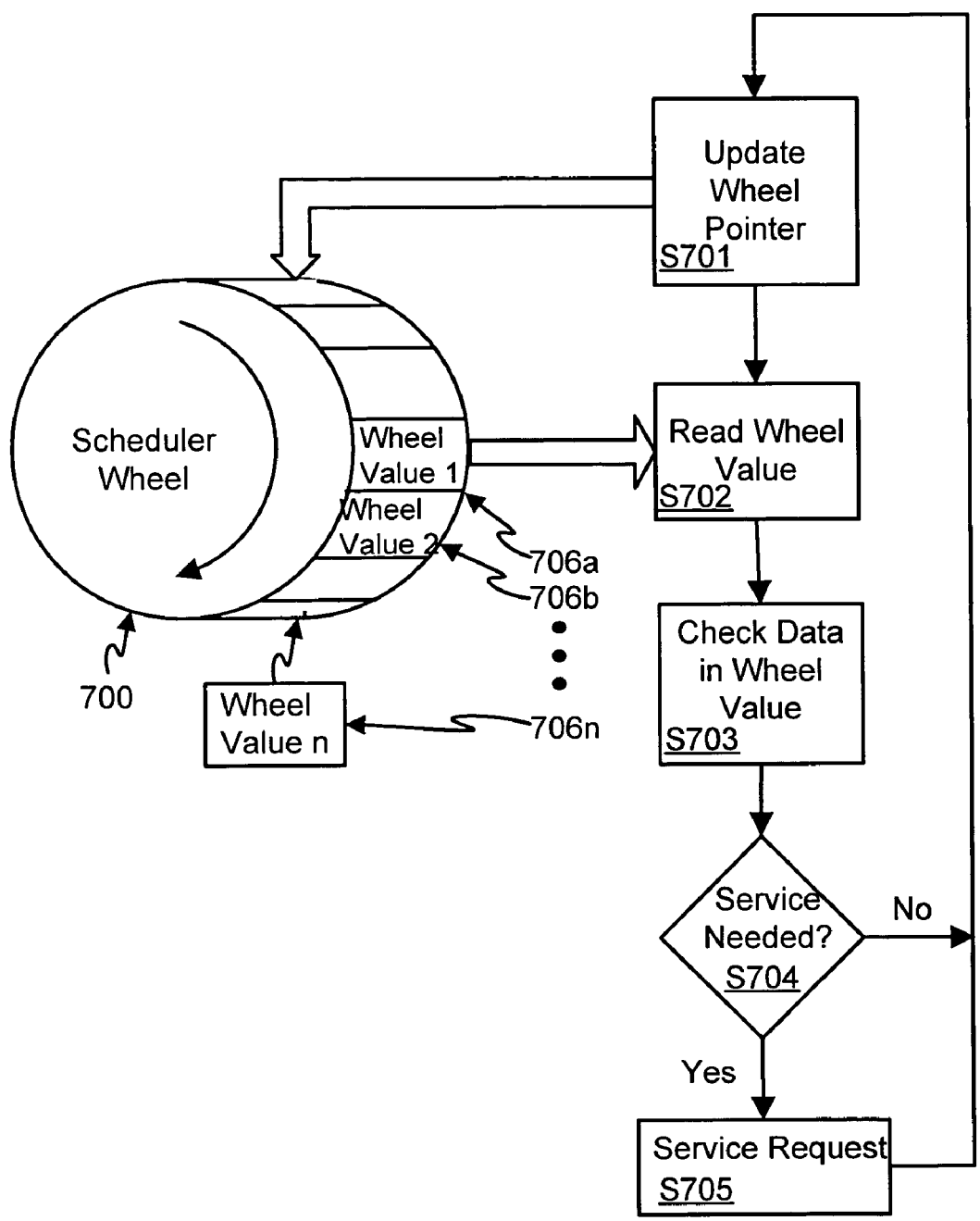
FIG. 7 is a flowchart of a scheduling algorithm according to an embodiment of the present invention.

FIG. 7 is a diagram illustrating functions of scheduler 107 according to an embodiment of the invention. As shown, scheduler wheel 700 includes multiple entries 706 identifying which device (such as the memory unit controller 108, the access port controller 109, or the interconnect controller 110) within the arbiter 102 is to be serviced next. Each of the controllers within the arbiter 102 can process read or write commands, so there are several possible values for each scheduler wheel 700 value entry 706*a*, 706*b*, . . . , 706*n*.

Functionality of the scheduler 107 includes updating the wheel pointer at state S701. In a following state S702, the appropriate wheel value 706 is a read from the scheduler wheel 700 at the address pointed to by state S701. In state S703, data in the wheel value entry 706 is checked for validity and the scheduled controller within the arbiter 102 is checked for a pending request. If it is determined that the scheduled device needs to be serviced in state S704, then the request is serviced in state S705. If the scheduled controller does not require service in state 704, then control moves to update wheel pointer 700 in state S701. This process repeats and pointer (in state S701) is updated as scheduler wheel 700 rotates as shown, servicing the scheduled requests as needed.

FIG. 8 is a table 801 including example of entries 706 associated with scheduler 700 according to an embodiment of the invention. IC_RD indicates a time slot 805-1 in the scheduler 700 for a read command for the interconnect controller 110; IC_WR indicates a time slot 805-2 for a write command for the interconnect controller 110. PC_RD indicates a time slot 805-3 for a read command for the access port controller 109; PC_WR indicates a time slot 805-4 for a write command for the access port controller 109. By increasing the number of entries 805 in table 801 associated with the scheduler wheel 700, even more scheduling granularity can be accomplished.

The example entries 706 in table 801 shown in FIG. 8 illustrate a heavy bias towards IC_RC and PC_RD, as these are the interconnect controller read and port controller read respectively. This would be especially useful in a read-intensive application, such as streaming media where the stored content in the memory units stays relatively constant. The example shown here also reserves more of the read scheduled slots for remote access nodes. That is why there are more IC_RDs than there are PC_RDs. In the streaming media application, most of the scheduled time is available for reading from the memory units. However, the memory units do (at some point) need to be loaded with data, so there are a couple PC_WR for port controller write scheduled events as well as some IC_WR for interconnect write scheduled events. The size and content of the scheduler wheel table 801 can be adjusted and edited as needed to tune the read and write performance for both local as well as remote access nodes to the specific application required.

Figure 9:
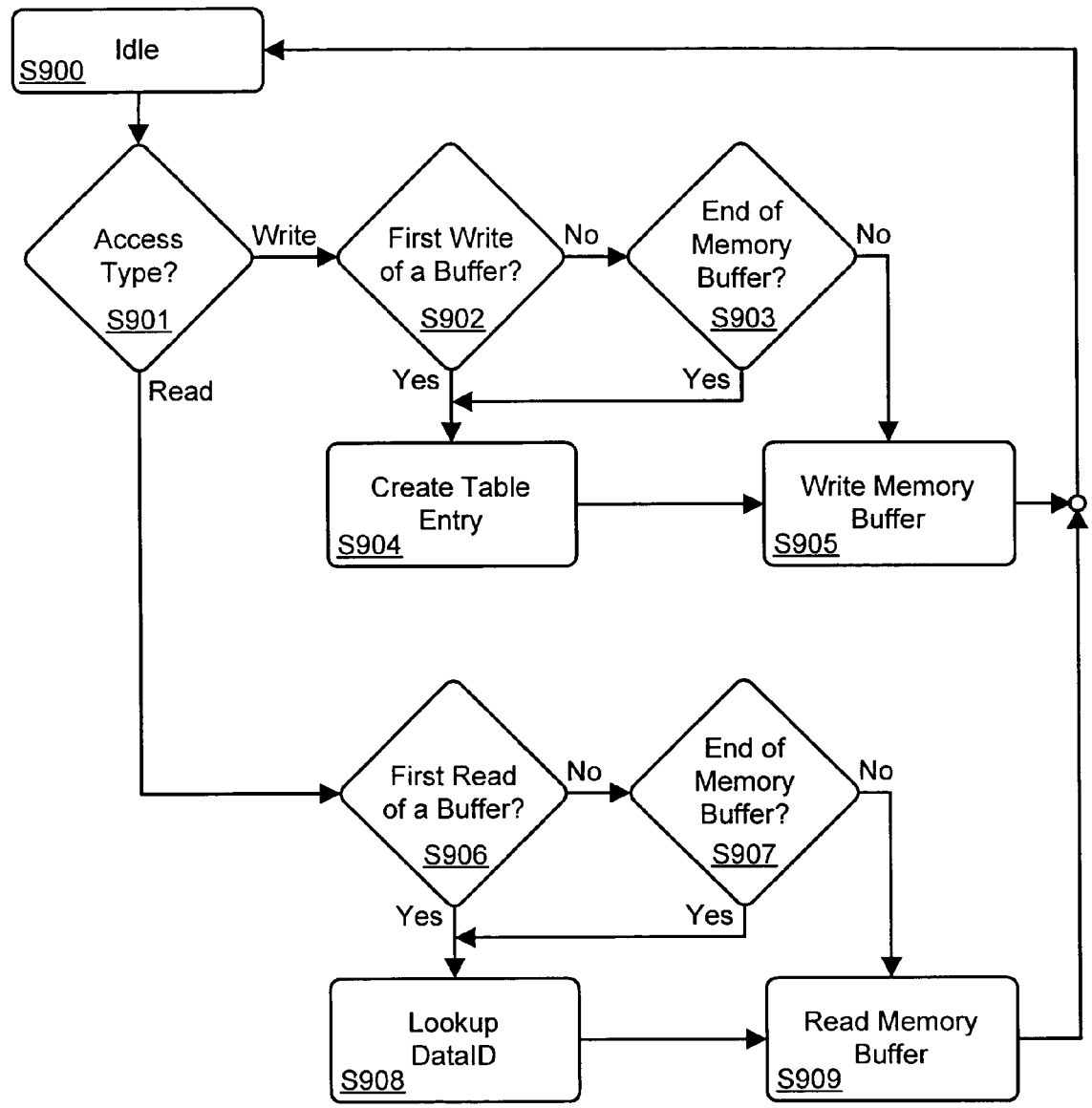
FIG. 9 is a flow chart depicting behavior of a scheduler and address translator according to an embodiment of the present invention.

FIG. 9 is a flow chart illustrating functionality of scheduler 107 and the allocation table 504 according to one embodiment of the invention. Starting from an idle state S900, a request for a memory unit access is detected causing process flow to proceed to state S901. In state S901, the access type (such as a read or write) is determined. If the request includes a write command, we transition into state S902 in which the first write status is determined. For example, a determination is made whether a write request is related to other previously serviced writes. If this is the first write access, which is typical when creating a new memory buffer or a new DataID, we then transition into state S904. If this write access is the beginning of a new DataID, then the logical memory buffer number is set to zero indicating that this is the first memory buffer for this DataID, and a new allocation table entry is created in state S904. If this is not the first memory buffer within the DataID, the logical buffer number is incremented, and a new allocation table entry is created in state S904 and written into the allocation table 504 inside address translator 104.

Once the allocation table entry has been written into allocation table 504, the scheduler 107 can calculate the physical address within the memory unit 101, and flow transitions into state S905 where the memory buffer (sub portion of memory unit 101) is written. Once the memory buffer is written in states S905, the current memory buffer offset is adjusted and stored in the allocation table entry. Flow then transitions back to the idle state S900 and waits for the next access. If an access request is a write request, but it isn't the first write of memory buffer in state S902, then the current memory buffer offset is checked in state S903 to determine if it's at the end of a memory buffer. If so, a new allocation table entry is created in state S904 by using the DataID as well as the logical memory buffer number. Thereafter, the memory buffer is written and the current memory buffer offset is stored in the allocation table entry in state S905, and flow continues at idle state S900. If it is determined that we are not at an end of the memory buffer in state S903, the memory buffer offset is incremented and written to the allocation table entry, the memory buffer is written to in state S905. As shown, flow continues at idle state S900 after writing to the memory buffer.

If the memory access type in state S901 is a read, then scheduler 107 determines whether or not the request is the first read of the memory buffer in state S906. If it is determined that this is the first read within this memory buffer, control moves to scheduler 107 that uses the DataID and logical buffer number in state S908 to look up a corresponding valid entry in the allocation table 504. The logical buffer number allows multiple memory buffers to be allocated to a single DataID, and also allows the logical memory buffers to be accessed in any order.

In general, the first logical memory buffer will start with an address of zero, the second logical memory buffer will have a logical address of one, and so on. Once the allocation table entry corresponding to the required DataID and logical buffer number has been located in state S908, the physical memory buffer can be read in state S909. Control is then returned to the idle state S900. If the read access is not the first read of the memory buffer in state S906, then the current memory buffer offset is tested to see if the end of the memory buffer has been reached in state S907. If the end has not been reached in state S907, then the memory buffer is read in state S909. Process flow continues to the idle state S900. When the end of the memory buffer has been reached in state S907 for a (series of) related reads, then the next appropriate allocation table entry is searched for in state S908 using the DataID and logical buffer number.

Figure 10:
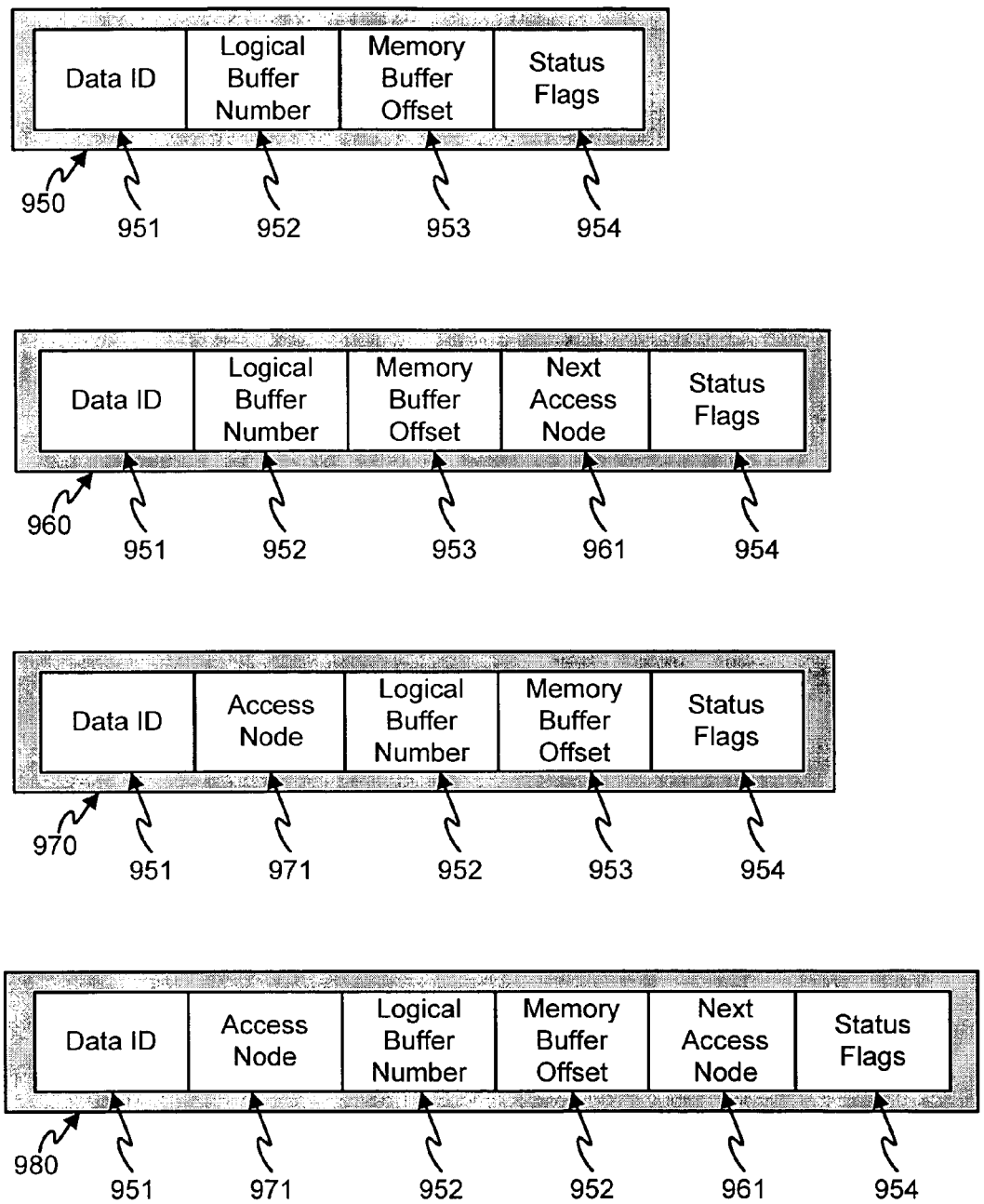
FIG. 10 is a bit definition for entries in an allocation table according to an embodiment of the present invention.

FIG. 10 is a diagram of four different layouts for the individual entries in allocation table 504 in embodiments of the invention. As shown, table entry 950 includes data fields for DataID 951, address, 952, memory buffer offset 953, and flags 954. According to this implementation, DataID 951 uniquely identifies a file, logical data stream object or portion of data which may be available in a local or remote memory unit 101 of access nodes 201 in system 223.

Allocation table entry 950 is used for data locally stored in a access node 201. The file or data for each DataID can be contained in multiple memory buffers within the memory unit 101. A logical address 952 (such as a buffer number) indicates a relative buffer address within this specific DataID, and allows for very flexible memory buffer allocation. Using the logical address 952 (buffer number), memory buffers can be accessed logically, and in any order within a given DataID. The memory buffer offset 953 tracks a running total of the amount of data stored within the memory buffer indicated by the DataID and the logical buffer number. The status flags 954 store values specific to this DataID and logical buffer number such as read-write access, read-only access, allocation table entry used, and also allows an allocation table entry to be blocked. Blocking an allocation table entry can be useful if a specific memory buffer within the memory unit 101 is determined to be malfunctioning or should not be used for some reason.

In the second implementation (table entry 960) of FIG. 10, each allocation table entry 960, contains DataID 951, logical buffer number 952, memory buffer offset 953, next access node 961, and status flags 954. The description of this second implementation 960 is the same as the first implementation 950, except for the next access node 961. The data field for the next access node 961 has been added to allow the entries in an allocation table 504 to point to the memory unit which contains the next memory buffer after the current memory buffer. The next access node 961 can point to any other access node in the storage memory system. This allows each memory buffer represented in the allocation table to directly point to the access node that contains the next logically consecutive memory buffer storing a next portion of a logical data stream stored amongst multiple access nodes 201 or memory module 205.

According to another implementation, allocation table 504 includes allocation entries 970, each including DataID 951, access node information 971, logical buffer number (address) 952, memory buffer offset 953, and status flags 954. The functionality of this third implementation 970 is generally the same as the first implementation 950, except for the access node information 971. The data field for the access node information 971 has been added to allow the entries in an allocation table 504 to point to the memory unit in any other node in the storage memory system. This enables virtual storage of data in memory system, in which each DataID and logical buffer number stored in the allocation table represent any physical address in the entire storage memory system.

In the fourth implementation of FIG. 10, each allocation table entry 980 includes DataID 951, access node information 971, logical buffer number 952, memory buffer offset 953, next access node 961, and status flags 954. The description of this fourth implementation 980 is the same as the first implementation 950, except for the addition of both the access node information 971 and the next node 961. The data field for the access node information 971 has been added to allow the entries in an allocation table 504 to point to the memory unit 101 in any other access node 201 or memory node 205 in the storage memory system 223. This allows a truly virtual storage memory system where each DataID and logical buffer number stored in the allocation table 504 can represent any physical address in the entire storage memory system 223. The data field for the next access node 961 has been added to allow the entries 980 in an allocation table 504 to point to the memory unit which contains the next logical memory buffer after the current memory buffer storing a portion of a data file. The next access node 961 can point to any other access node or memory node in the storage memory system. This allows each memory buffer represented in the allocation table to directly point to the node that contains the next logically consecutive memory buffer.

Software can also be used to determine the appropriate access node or memory node required for a requested DataID rather than reading it from the allocation table entry. In this case, either allocation table entry format 950 or 960 would be suitable.

Figure 11:
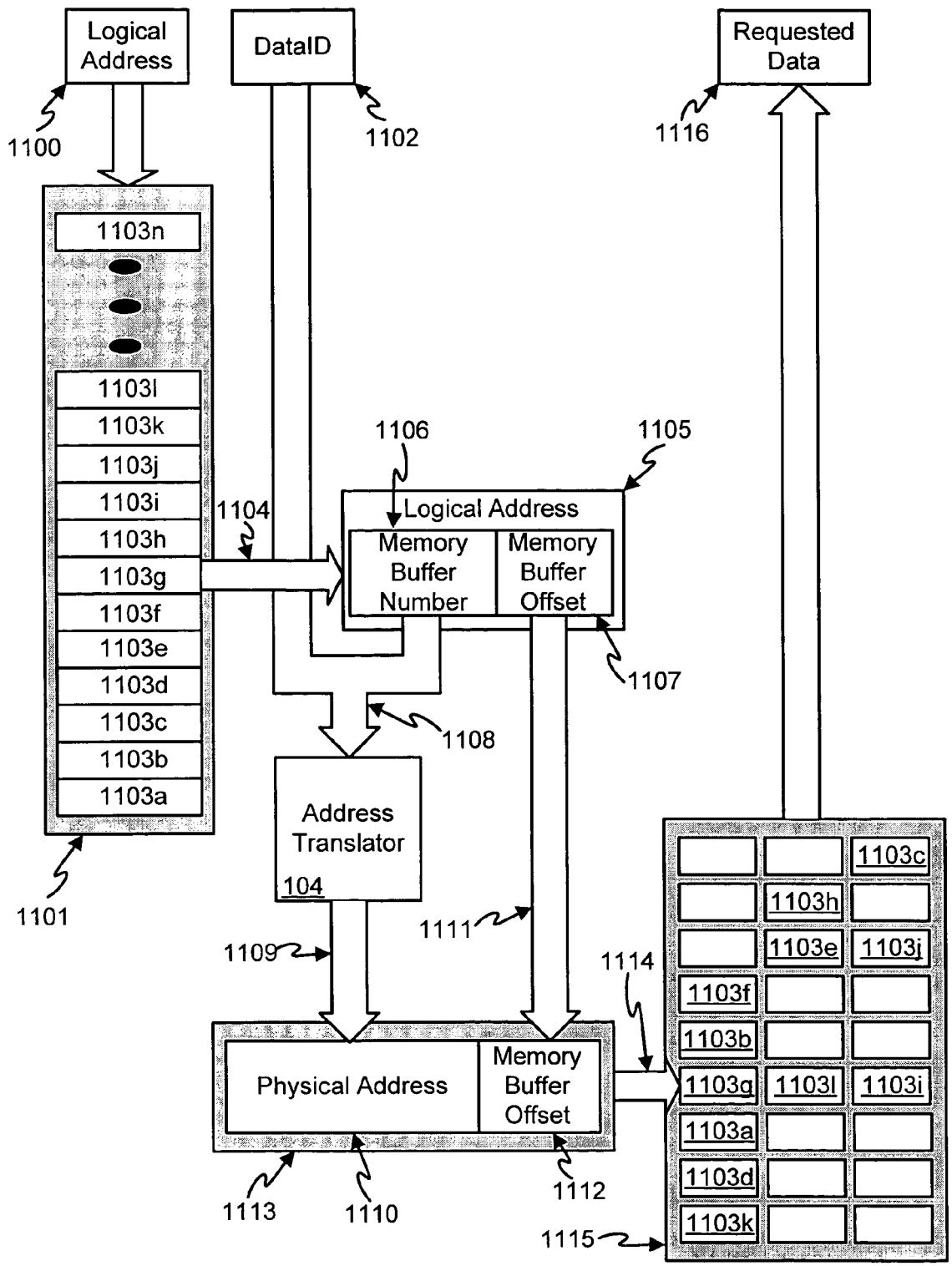
FIG. 11 is a diagram illustrating a technique of retrieving data according to an embodiment of the present invention.

FIG. 11 is a diagram illustrating a process for accessing a logical data stream stored in one or multiple memory units according to logical addresses. The technique involves utilizing the DataID 1102 and logical address 1100 which translate into a physical address 1110 and offset 1112 for reading the appropriate data from corresponding memory unit(s) 1115.

In one embodiment, logical address 1100, is a flat, linear pointer that starts at an offset of '0' (for a particular data stream) and counts upward for data contained in the specific logical data stream. A logical representation is depicted as memory segment 1101 including individual memory buffers 1103a, 1103b, . . . 1103n. Each memory buffer 1103 (which is a sub-portion of a particular memory unit 101 at a corresponding access node 201 or memory node 205) are addressed in order without having to worry about the physical representation in the corresponding one or multiple memory units 101. For example, the logical address 1105 for memory buffer 1103g is accessed as shown with pointer 1104. Pointer 1104 is a single pointer that represents the offset into the logical data stream identified by DataID 1102.

Logical address 1105 is divided into two parts, the memory buffer number 1106, and the memory buffer offset 1107. The exact position where the logical address is divided is based on the size of each individual memory buffer 1103 and is divided so that the memory buffer offset can address each individual location inside each memory buffer. A remaining upper portion of the logical address 1105 is then used as the actual memory buffer number 1106.

DataID 1102 is then concatenated with the memory buffer number 1106 at pointer 1108, which is supplied to the address translator 104. The result 1109 from the address translator 104 defines a pointer to the physical address 1110 at the base of the memory buffer 1103 in which access is requested, but not the actual location within the requested memory buffer. The memory buffer offset 1107, which is a portion of the logical address 1105, is then shown as memory buffer offset 1112. The physical address 1110 is then concatenated with the memory buffer offset 1112 to form the complete physical address 1113. The physical address 1113 then forms a complete physical address pointer into the memory unit 101 shown as pointer 1114.

The memory unit shown as 1115, contains the individual memory buffers 1103, which may not be stored in any particular order as a result of memory fragmentation as previously discussed. Pointer 1114 points directly to the physical memory buffer 1103 associated with the memory access request. The requested portion of the memory buffer 1103 is then read (or written as the case may be), and the requested data returned, shown as 116. In general, this process occurs each and every time a memory unit is read from or written to, allowing the physical location of a data object to be completely abstracted away from the logical address. Consequently, a logical address is converted into a physical address identifying a location in (distributed) memory in which to service an access request.

Figure 12:
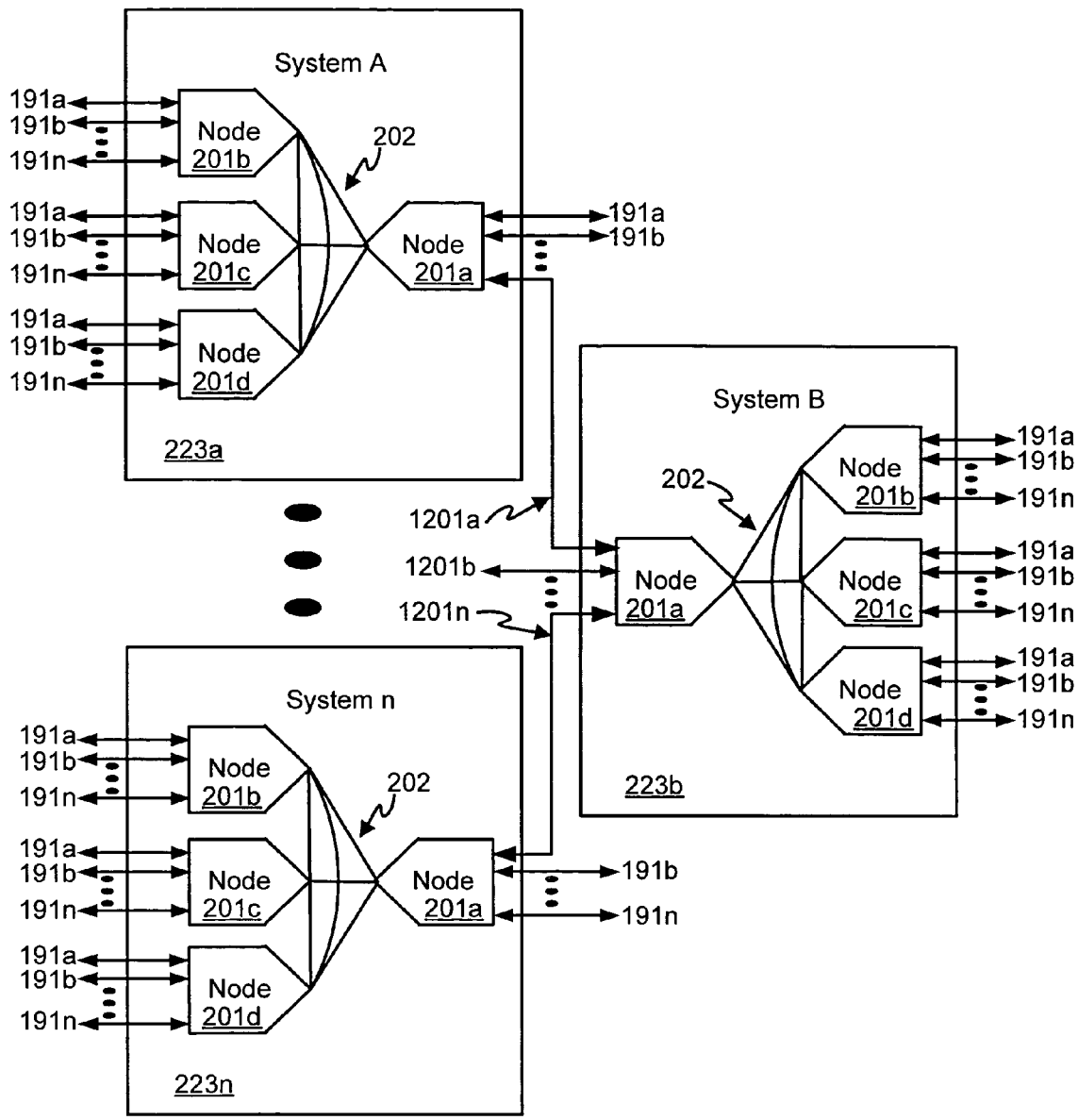
FIG. 12 is a block diagram showing multiple storage systems connected together to create a larger combined system as an embodiment of the present invention.

FIG. 12 illustrates how multiple systems can be linked together to form yet an even larger and more flexible data storage system. For this application, multiple storage memory systems 223a, 223b, . . . , 223n (223) can be linked together with connections 1201a, 1201b, . . . , 1201n (1201). Each of these connections 1201 can be the same or different physical format as those used in the interconnected mesh 202. In this example, System-A (223a) is shown linked to System-B (223b) utilizing connection 1201a. Similarly, System-B (223b) is also linked to System-n (223n) by connection 1201n. This same practice can be used to link many systems together to create a large array of linked systems.

This topology is quite useful for moving content data from one system to another, for redundancy, and for distributing a system over a geographic region. For example, if many clients are concentrated in 3 distinct areas, 3 individual systems could be located closer to the actual clients, but the content data can easily move between the systems. Locating systems closer to clients may be desirable in some cases to reduce transport costs to deliver the content. The ability to break up a large area or region into smaller localized areas gives the most flexibility for each individual application. Linking the individual systems together allows a quick path to move content data between systems. The speed of the connections 1201 can be individually scaled depending on the specific application. On the low end, one system would merely appear as a client device to an adjacent system. On the higher end, each link connection 1201 could relay memory requests from one system to another, forming an interconnected mesh of complete systems.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of accessing memory from multiple interconnected access nodes, at least one access node including a memory unit accessible by other interconnected access nodes, the method comprising:

receiving a memory access request at a given access node from a source other than from another access node;

determining a physical memory address associated with the memory access request; and determining whether the physical memory address corresponds to a memory unit local to the given access node and:

if so, servicing the memory access request by accessing a memory unit local to the given access node;

if not, servicing the memory access request by accessing a memory unit located at a node other than the given access node.

2. A method as in claim 1, wherein determining a physical memory address includes:

at the given node receiving the access request, converting a logical address associated with the access request to the physical address.

3. A method as in claim 1 further comprising:

at each of multiple interconnected access nodes, maintaining an allocation table to map logical addresses to corresponding physical addresses identifying to which of the multiple interconnected access nodes the logical address pertains.

4. A method as in claim 1, wherein accessing a memory unit located at a node other than the given access node includes:
via a serial link, supporting communications between the given access node and a memory unit at another access node over a physical point-to-point connection.

5. A method as in claim 1 further comprising:
fabricating the access nodes as individual circuit boards that plug into a common backplane, the common backplane including physical connections to link each of the access nodes to each other.

6. A method as in claim 1 further comprising:
storing portions of a logical data stream in memory units of multiple interconnected access nodes.

7. A method as in claim 6 further comprising:
at the given access node, retrieving selected portions of the logical data stream over time; and
transmitting the logical data stream to a user.

8. A method as in claim 7 further comprising:
receiving the logical data stream for playback in real-time.

9. A method as in claim 6 further comprising:
periodically generating memory access requests to retrieve portions of the logical data stream.

10. A method as in claim 1 further comprising:
at the given access node, receiving local memory access requests from the source;
at the given access node, receiving remote memory access requests from other access nodes; and
scheduling times for servicing the local memory access requests and remote memory access requests.

11. A method as in claim 1, wherein receiving a memory access request includes:
receiving a request to read from the local memory unit of the given access node;
receiving a request to write to the local memory access unit of the given access node; and
scheduling times for servicing the requests to read and write from/to the local memory unit of the given access node.

12. A data storage system comprising:
a local access node including:
a node interface to support communications with multiple remote access nodes and their corresponding memory units;
a local memory unit to store data;
a port interface to receive memory access requests from a source other than the remote access nodes; and
a translator to process the memory access requests received through the port interface, the translator utilizing a data identifier associated with a given memory access request to determine whether to access the local memory unit or one of the multiple remote access nodes' memory units in order to service the given memory access request.

13. A data storage system as in claim 12, wherein the translator converts the data identifier associated with the given memory access request to a physical address identifying, at least in part, which memory unit of the corresponding multiple remote access nodes to access in order to service the given memory access request.

14. A data storage system as in claim 12 further comprising:
links over which the remote access nodes and the local access node communicate to access data stored in their corresponding memory units.

15. A data storage system as in claim 14, wherein the links include point-to-point connections physically coupling each remote and local access nodes to each other.

16. A data storage system as in claim 14, wherein parallel data retrieved from a memory unit of a remote access node is converted to a serial stream prior to transmission over a link to the local access node.

17. A data storage system as in claim 14, wherein the access nodes are circuit boards that plug into a common backplane, the common backplane including physical connections to link the access nodes to each other.

18. A data storage system as in claim 12, wherein the memory units of the access nodes include electronically addressable memory chips.

19. A data storage system as in claim 12, wherein the data identifier associated with a given memory access request includes a request for a logical data stream stored, at least in part, among multiple remote access nodes.

20. A data storage system as in claim 12, wherein the data identifier associated with a given memory access request includes a request for a logical data stream, portions of which are stored in memory units of both the local and remote access nodes.

21. A data storage system as in claim 20, wherein portions of the logical data stream are timely retrieved from the remote and local access nodes for substantial real-time playback of the logical data stream.

22. A data storage system as in claim 21, wherein the port interface periodically generates memory access requests to retrieve portions of the logical data stream that are, in turn, transmitted to a user substantially playing back the logical data stream in real-time.

23. A data storage system as in claim 22, wherein the local access node further includes:
an arbitrator to arbitrate servicing of locally received memory access requests received through the port interface of the local access node and remotely received memory access requests received through the node interface from remote access nodes.

24. A data storage device as in claim 23, wherein the arbitrator includes:
a scheduler to schedule locally and remotely received memory access requests for access to the local memory unit.

25. A data storage system as in claim 12, wherein the memory access requests include both requests to read and requests to write to corresponding memory units of the access nodes.

26. A data storage system as in claim 12, wherein contents of the local memory unit and remote access nodes' memory units are maintained by both the local and remote access nodes to collectively form a shared memory storage system.

27. A data storage system as in claim 26, wherein the translator includes an allocation table for mapping logical addresses associated with stored portions of a data stream to physical addresses identifying a corresponding location of the shared memory storage system in which to locate portions of the data stream.

28. In a data storage system including multiple access nodes and corresponding memory units interconnected via links, an access node comprising:

a memory unit to store data information;

an interconnect interface circuit supporting communications with the multiple remote access nodes and their corresponding memory units over the links;

a port interface to receive memory access requests from a source other than remote access nodes communicating through the interconnect interface circuit; and a translator circuit that processes a given memory access request received from the source through the port interface to determine which of the multiple access node's memory unit of the data storage system to access in order to service the given memory access request.

29. A data storage system comprising:

a local access node including:

a node interface to support communications with multiple remote access nodes and their corresponding memory units;

a local memory unit to store data;

a port interface to receive memory access requests from a source other than the remote access nodes; and means for processing the memory access requests received through the port interface, the processing means translating a data identifier associated with a given memory access request into a physical memory address to determine whether to access the local memory unit or one of the multiple remote access nodes' memory units in order to service the given memory access request.

30. A computer program product including a computer-readable medium having instructions stored thereon for processing data information, such that the instructions, when carried out by a processing device, enable the processing device to perform the steps of:

receiving a memory access request at a given access node from a source other than from another access node;

determining a physical memory address associated with the memory access request; and determining whether the physical memory address points to a memory unit local to the given access node and:

if so, servicing the memory access request by accessing a memory unit local to the given access node;

if not, servicing the memory access request by accessing a memory unit located at a node other than the given access node.

31. A data storage system comprising:

a plurality of memory access nodes, each of the memory access nodes including an interconnect interface to support communications with other memory access nodes; and links interconnecting the plurality of memory access nodes, at least one of the plurality of memory access nodes further including a memory unit for storing data, at least one of the plurality of memory access nodes further including a port interface module for communications with a user application initiating access to stored information, each of the plurality of access nodes further including a memory access arbiter for arbitrating communications to at least one of a local memory unit and a remote memory unit of another access node.

32. A data storage system as in claim 31, wherein the links comprise point-to-point connections physically coupling the memory access nodes to each other.

33. A data storage system as in claim 31, wherein the memory access nodes comprise circuit boards that plug into a common backplane, the common backplane including physical connections to link the memory access nodes to each other.

34. A data storage system as in claim 31, wherein the local memory unit and remote memory unit include electronically addressable memory chips.

35. A data storage system as in claim 31, wherein the electronically addressable memory chips are solid-state RAM (Random Access Memory) based memory devices.

36. A data storage system as in claim 31, wherein the arbiter further determines which of at least one memory unit to access to service a memory access request received from the user application.

37. A data storage system as in claim 36, wherein the memory access request includes a request to read from and/or a request to write to memory.

38. A data storage system as in claim 36, wherein the memory access request includes a data identifier and a logical address.

39. A data storage system as in claim 38, wherein the memory arbiter further includes an address translator to convert the data identifier and the logical address into a corresponding at least one physical address identifying which of at least one memory unit to access to service the memory access request.

40. A data storage system as in claim 39, wherein the address translator includes an allocation table for mapping logical addresses to the corresponding at least one physical address.

41. A data storage system as in claim 38, wherein the data identifier includes a request for a logical data stream, a portion of which is stored in the local memory unit and another portion of which is stored in the remote memory unit.

42. A data storage system as in claim 41, wherein the portions of the logical data stream are timely retrieved from the local memory unit and the remote memory unit for substantial real-time playback of the logical data stream.

43. A data storage system as in claim 42, wherein the port interface periodically generates memory access requests to retrieve portions of the logical data stream that are, in turn, transmitted to the user application substantially playing back the logical data stream in real-time.

44. A data storage system as in claim 31, wherein the memory arbiter further schedules times for servicing a plurality of memory access requests from users.

45. A data storage system as in claim 31, wherein the interconnect interface further includes a transceiver for processing outgoing and incoming data communicated over the links, the transceiver including a parallel-to-serial transmitter for transmitting data over the links and a serial-to-parallel receiver for receiving data over the links.

46. A data storage system as in claim 31, wherein the port interface supports communication via an application-level memory access protocol, and wherein each memory access node further includes an interconnect interface that supports communication using an inter-nodal memory access protocol.

47. In a data storage system including a plurality of memory access nodes and links interconnecting the plurality of memory access nodes, at least one memory access node comprising:

a local memory unit for storing data;

an interconnect interface for supporting communications with other memory access nodes over the links;

a port interface module supporting communications with a user application initiating access to stored information; and an arbiter for arbitrating communications among the memory unit, the interconnect interface and the port interface module, the arbiter determining whether to access the local memory unit or at least one other memory unit in the other memory access nodes to service a memory access request associated with the user application.

48. The at least one memory access node as in claim 47, wherein the port interface module supports communication via an application-level memory access protocol, and wherein the interconnect interface supports communication with the other memory access nodes using an inter-nodal memory access protocol.

49. The at least one memory access node as in claim 48, wherein the memory access request includes a data identifier and a logical address, and the arbiter further includes an address translator for converting the data identifier and the logical address into corresponding at least one physical address identifying which of the at least one memory units to access to service the memory access request.

50. The at least one memory access node as in claim 49, wherein the address translator includes an allocation table for mapping logical addresses to corresponding physical addresses.

51. The at least one memory access node as in claim 47, wherein the arbiter further schedules times for a plurality of memory access requests from users.

52. A data storage system comprising:
a plurality of memory access nodes; and
links interconnecting the plurality of memory access nodes, each of the plurality of memory access nodes including:
a memory means for electronically storing data;
a first interface means for supporting communications with the other memory access nodes;
a second interface means for supporting communications with a user; and
an arbiter means for arbitrating communications among the memory means, the first interface means, and the second interface means, the arbiter means determining which memory means to access to service a memory access request from the user.

53. A data storage system as in claim 52, wherein the arbiter means translates a logical address associated with the memory access request into a corresponding physical address identifying which memory unit to access to service the memory access request.

54. A data storage system comprising:
a plurality of memory access nodes, each of the memory access nodes including an interconnect interface to support communications with other memory access nodes; and
links interconnecting the plurality of memory access nodes,
at least one of the plurality of memory access nodes further including a memory unit for storing data,
at least one of the plurality of memory access nodes further including a port interface module for communications with a user application initiating access to stored information,
each of the plurality of access nodes further including a memory access arbiter for arbitrating communications to at least one of a local memory unit and a remote memory unit of another access node, the data storage system supporting operations of:
receiving a memory access request from a user at a given access node via a port interface module;
determining a memory address associated with the memory access request;
determining whether the memory address points to a memory unit local to the given access node; and
if the memory address points to a memory unit local to the given access node, servicing the memory access request by accessing a memory unit local to the given access node; and
if not, servicing the memory access request by accessing a memory unit located at a node other than the given access node.

55. The data storage system as in claim 54, wherein determining a memory address includes:
converting a logical address associated with the memory access request into a physical address identifying which memory unit to access to service the memory access request.

56. The data storage system as in claim 55, wherein converting a logical address into a physical address includes utilizing an allocation table mapping logical addresses to corresponding physical addresses.

57. The data storage system as in claim 54, wherein accessing a memory unit located at a node other than the given access node further includes:
converting parallel data into corresponding serial data prior to communication over the links.

58. A data storage system comprising:
a plurality of memory access nodes, each of the memory access nodes including an interconnect interface to support communications with other memory access nodes; and
links interconnecting the plurality of memory access nodes,
at least one of the plurality of memory access nodes further including a memory unit for storing data,
at least one of the plurality of memory access nodes further including a port interface module for communications with a user application initiating access to stored information,
each of the plurality of access nodes further including a memory access arbiter for arbitrating communications to at least one of a local memory unit and a remote memory unit of another access node, the data storage system supporting operations of:
storing portions of a logical data stream in multiple memory units in the data storage system;
receiving a memory access request for the logical data stream from a user at a given access node via a port interface module;
determining memory addresses associated with the memory access request;
retrieving the portions of the logical data stream from the multiple memory units over time; and
transmitting the logical data stream to the user at the given access node.

59. The data storage system as in claim 58, wherein transmitting the logical data stream further comprises transmitting the logical data stream for playback in real-time.

60. The data storage system as in claim 58 further supporting an operation of:
periodically generating memory access requests to retrieve the portions of the logical data stream.

61. A data storage system comprising:
a plurality of memory access nodes, each of the memory access nodes including an interconnect interface to support communications with other memory access nodes; and
links interconnecting the plurality of memory access nodes,
at least one of the plurality of memory access nodes further including a memory unit for storing data,
at least one of the plurality of memory access nodes further including a port interface module for communications with a user application initiating access to stored information,
each of the plurality of access nodes further including a memory access arbiter for arbitrating communications to at least one of a local memory unit and a remote memory unit of another access node, the data storage system supporting operations of:
  at a given access node, receiving local memory access requests via port interface modules;
  at the given access node, receiving remote memory access requests from other access nodes; and
  scheduling times for servicing the local memory access requests and remote memory access requests.

62. A data storage system comprising:
a plurality of memory access nodes, each of the memory access nodes including an interconnect interface to support communications with other memory access nodes; and
links interconnecting the plurality of memory access nodes,
at least one of the plurality of memory access nodes further including a memory unit for storing data,
at least one of the plurality of memory access nodes further including a port interface module for communications with a user application initiating access to stored information,
each of the plurality of access nodes further including a memory access arbiter for arbitrating communications to at least one of a local memory unit and a remote memory unit of another access node, the data storage system supporting operations of:
receiving a request to read from the local memory unit of the given access node;
  receiving a request to write to the local memory unit of the given access node; and
  scheduling times for servicing the requests to read from and write to the local memory unit of the given access node.

63. A computer program product including a computer-readable medium having instructions stored thereon for processing data information, such that the instructions, when carried out by a processing device, enable the processing device to perform the steps of:
receiving a memory access request at a given access node from a user;
determining a physical memory address associated with the memory access request;
determining whether the physical memory address points to a memory unit local to the given access node; and
  if so, servicing the memory access request by accessing a memory unit local to the given access node;
  if not, servicing the memory access request by accessing a memory unit located at a node other than the given access node.

\* \* \* \* \*